US012566812B2

(12) United States Patent
Chen et al.

(10) Patent No.: US 12,566,812 B2
(45) Date of Patent: Mar. 3, 2026

(54) WEB PAGE DISPLAY METHOD, APPARATUS, AND SYSTEM

(71) Applicant: Petal Cloud Technology Co., Ltd., Dongguan (CN)

(72) Inventors: Ying Chen, Beijing (CN); Yaoming Liu, Beijing (CN)

(73) Assignee: Petal Cloud Technology Co., Ltd., Dongguan (CN)

( * ) Notice: Subject to any disclaimer, the term of this patent is extended or adjusted under 35 U.S.C. 154(b) by 0 days.

(21) Appl. No.: 18/282,386

(22) PCT Filed: Mar. 14, 2022

(86) PCT No.: PCT/CN2022/080764
§ 371 (c)(1),
(2) Date: Sep. 15, 2023

(87) PCT Pub. No.: WO2022/194107
PCT Pub. Date: Sep. 22, 2022

(65) Prior Publication Data
US 2024/0143686 A1 May 2, 2024

(30) Foreign Application Priority Data

Mar. 18, 2021 (CN) .......................... 202110291380.9

(51) Int. Cl.
*G06F 1/32* (2019.01)
*G06F 1/3234* (2019.01)
*G06F 16/957* (2019.01)

(52) U.S. Cl.
CPC ........ *G06F 16/9577* (2019.01); *G06F 1/3234* (2013.01)

(58) Field of Classification Search
CPC ..................................... G06F 1/32; G06F 1/16
See application file for complete search history.

(56) References Cited

U.S. PATENT DOCUMENTS

| | | | |
|---|---|---|---|
| 7,407,108 B1 | 8/2008 | Euler et al. | |
| 2012/0192080 A1 | 7/2012 | Lloyd | |
| 2016/0021208 A1* | 1/2016 | Freiman | H04L 67/306 |
| | | | 709/203 |
| 2018/0217964 A1 | 8/2018 | Lin et al. | |

(Continued)

FOREIGN PATENT DOCUMENTS

| | | |
|---|---|---|
| CN | 101674262 A | 3/2010 |
| CN | 102316536 A | 1/2012 |

(Continued)

*Primary Examiner* — Paul B Yanchus, III
(74) *Attorney, Agent, or Firm* — Slater Matsil, LLP

(57) ABSTRACT

In the method, a server not only obtains a first web page request of a first terminal apparatus, but also obtains first energy consumption information of the first terminal apparatus. After determining first web page content corresponding to the first web page request, the server may select, from first web page elements included in the first web page content, a second web page element whose needed energy consumption is not greater than energy consumption indicated by the first energy consumption information, and transmit second web page content including the second web page element to the first terminal apparatus, to enable the first terminal apparatus to display the second web page content.

18 Claims, 6 Drawing Sheets

S11

A server obtains a first web page request transmitted by a first terminal apparatus and first energy consumption information of the first terminal apparatus

S12

The server selects, based on the first energy consumption information, a second web page element from a first web page element included in first web page content

S13

The server transmits second web page content including the second web page element to the first terminal apparatus

(56)  References Cited

U.S. PATENT DOCUMENTS

2019/0258305 A1* 8/2019 Marchiori ........... G06F 16/1737
2020/0218329 A1* 7/2020 Nagarajan ................. G06F 1/28

FOREIGN PATENT DOCUMENTS

CN          108733738  A       11/2018
CN          108768870  A       11/2018
KR          101783148  B1      9/2017

* cited by examiner

WEB PAGE DISPLAY METHOD, APPARATUS, AND SYSTEM

CROSS REFERENCE TO RELATED APPLICATIONS

This application is a national stage of International Application No. PCT/CN2022/080764, filed on Mar. 14, 2022, which claims priority to Chinese Patent Application No. 202110291380.9 filed on Mar. 18, 2021. Both of the aforementioned applications are hereby incorporated by reference in their entireties.

TECHNICAL FIELD

This application relates to the field of terminal device technologies, and in particular, to a web page display method, an apparatus, and a system.

BACKGROUND

Currently, functions of a mobile device are increasingly rich. In this case, a user may browse a web page by using the mobile device, to meet work and entertainment requirements of the user.

When the user browses the web page by using the mobile device, the mobile device first needs to transmit a web page request to a server. After receiving the web page request, the server transmits web page content corresponding to the web page request to the mobile device. After receiving the web page content, the mobile device displays the web page content through a display screen of the mobile device, to meet a requirement of the user for browsing the web page.

However, when the mobile device displays the web page content, a large amount of network traffic and power of the mobile device are consumed, and even subsequent use of the mobile device is affected.

SUMMARY

To resolve a problem that a large amount of network traffic and power of a mobile device are consumed by the mobile device to display web page content by using a current technology, embodiments of this application provide a web page display method, an apparatus, and a system.

According to a first aspect, an embodiment of this application discloses a web page display method, including:

A server obtains a first web page request transmitted by a first terminal apparatus and first energy consumption information of the first terminal apparatus.

The server selects, based on the first energy consumption information, a second web page element from a first web page element included in first web page content. The first web page content is web page content corresponding to the first web page request, and energy consumption needed by the second web page element is not greater than energy consumption indicated by the first energy consumption information.

The server transmits second web page content including the second web page element to the first terminal apparatus.

According to the foregoing steps, the server may select, from the first web page elements included in the first web page content, the second web page element whose needed energy consumption is not greater than the energy consumption indicated by the first energy consumption information, and transmit the second web page content including the second web page element to the first terminal apparatus, to enable the first terminal apparatus to display the second web page content. Therefore, the server may selectively transmit a web page element to the first terminal apparatus, to reduce energy consumption of the first terminal apparatus.

In an optional design, that the server selects, based on the first energy consumption information, a second web page element from a first web page element included in first web page content includes:

The server selects the second web page element from the first web page element based on energy consumption information of the first web page element transmitted by a second terminal apparatus and based on the first energy consumption information.

In an optional design, that the server selects, based on the first energy consumption information, a second web page element from a first web page element included in first web page content includes:

The server determines energy consumption information of the first web page element.

The server selects the second web page element from the first web page element based on the energy consumption information of the first web page element determined by the server and the first energy consumption information.

In an optional design, the first energy consumption information includes at least one of first network traffic information of the first terminal apparatus and first power information of the first terminal apparatus.

In an optional design, the first energy consumption information of the first terminal apparatus includes the first network traffic information of the first terminal apparatus, and network traffic needed by the first terminal apparatus to display the second web page element is less than network traffic indicated by the first network traffic information.

The first energy consumption information of the first terminal apparatus includes the first power information of the first terminal apparatus, and power needed by the first terminal apparatus to display the second web page element is less than power indicated by the first power information.

According to a second aspect, an embodiment of this application discloses a web page display method, including:

A first terminal apparatus determines first energy consumption information.

The first terminal apparatus transmits the first energy consumption information and a first web page request to a server.

The first terminal apparatus obtains and displays second web page content transmitted by the server. Energy consumption needed by a second web page element included in the second web page content is not greater than energy consumption indicated by the first energy consumption information.

According to the foregoing steps, the first terminal apparatus may transmit the first energy consumption information to the server, so that the server selectively transmits a web page element to the first terminal apparatus based on the first energy consumption information, to reduce energy consumption of the first terminal apparatus.

In an optional design, the first energy consumption information includes at least one of first network traffic information of the first terminal apparatus and first power information of the first terminal apparatus.

In an optional design, the first energy consumption information includes the first network traffic information of the first terminal apparatus, and that a first terminal apparatus determines first energy consumption information includes:

The first terminal apparatus determines the first network traffic information based on available network traffic of the first terminal apparatus.

The first energy consumption information includes the first power information of the first terminal apparatus, and that a first terminal apparatus determines first energy consumption information includes:

The first terminal apparatus determines the first power information based on remaining power of the first terminal apparatus.

According to a third aspect, an embodiment of this application discloses a web page display method, including:

A second terminal apparatus determines energy consumption information of a first web page element included in first web page content.

The second terminal apparatus transmits the first web page content and the energy consumption information of the first web page element to a server.

According to the foregoing steps, the second terminal apparatus may not only generate the first web page content, but also transmit energy consumption information of the first web page elements included in the first web page content to the server. After receiving the first web page content and the energy consumption information of the first web page element, the server may select, based on the energy consumption information of the first web page element, a second web page element from the first web page element included in the first web page content, and transmit a first terminal apparatus to the first terminal apparatus, to reduce energy consumption of the first terminal apparatus.

According to a fourth aspect, an embodiment of this application discloses a web page display apparatus, including:

a processor and a transceiver interface.

The transceiver interface is configured to obtain a first web page request transmitted by a first terminal apparatus and first energy consumption information of the first terminal apparatus.

The processor is configured to select, based on the first energy consumption information, a second web page element from a first web page element included in first web page content. The first web page content is web page content corresponding to the first web page request, and energy consumption needed by the second web page element is not greater than energy consumption indicated by the first energy consumption information.

The transceiver interface is further configured to transmit second web page content including the second web page element to the first terminal apparatus.

In an optional design, the processor is specifically configured to select the second web page element from the first web page element based on energy consumption information of the first web page element transmitted by a second terminal apparatus and based on the first energy consumption information.

In an optional design, the processor is specifically configured to determine energy consumption information of the first web page element, and select the second web page element from the first web page element based on the energy consumption information of the first web page element determined by the processor and the first energy consumption information.

In an optional design, the first energy consumption information includes at least one of first network traffic information of the first terminal apparatus and first power information of the first terminal apparatus.

In an optional design, the first energy consumption information of the first terminal apparatus includes the first network traffic information of the first terminal apparatus, and network traffic needed by the first terminal apparatus to display the second web page element is less than network traffic indicated by the first network traffic information.

The first energy consumption information of the first terminal apparatus includes the first power information of the first terminal apparatus, and power needed by the first terminal apparatus to display the second web page element is less than power indicated by the first power information.

According to a fifth aspect, an embodiment of this application discloses a web page display apparatus, including:

a processor and a transceiver interface.

The processor is configured to determine first energy consumption information.

The transceiver interface transmits the first energy consumption information and a first web page request to a server, and obtains second web page content transmitted by the server. Energy consumption needed by a second web page element included in the second web page content is not greater than energy consumption indicated by the first energy consumption information.

The processor is further configured to display the second web page content.

In an optional design, the first energy consumption information includes at least one of first network traffic information of a first terminal apparatus and first power information of the first terminal apparatus.

In an optional design, the first energy consumption information includes the first network traffic information of the first terminal apparatus, and the processor is specifically configured to determine the first network traffic information based on available network traffic of the first terminal apparatus.

The first energy consumption information includes the first power information of the first terminal apparatus, and the processor is specifically configured to determine the first power information based on remaining power of the first terminal apparatus.

According to a sixth aspect, an embodiment of this application discloses a web page display apparatus, including:

a processor and a transceiver interface.

The processor is configured to determine energy consumption information of a first web page element included in first web page content.

The transceiver interface is configured to transmit the first web page content and the energy consumption information of the first web page element to a server.

According to a seventh aspect, an embodiment of this application discloses a server, including:

at least one processor and a memory.

The memory is configured to store program instructions.

The processor is configured to invoke and execute the program instructions stored in the memory, to enable a terminal apparatus to perform the web page display method according to the first aspect.

According to an eighth aspect, an embodiment of this application discloses a terminal apparatus, including:

at least one processor and a memory.

The memory is configured to store program instructions.

The processor is configured to invoke and execute the program instructions stored in the memory, to enable the terminal apparatus to perform the web page display method according to the second aspect.

According to a ninth aspect, an embodiment of this application discloses a terminal apparatus, including:

at least one processor and a memory.

The memory is configured to store program instructions.

The processor is configured to invoke and execute the program instructions stored in the memory, to enable the terminal apparatus to perform the web page display method according to the third aspect.

According to a tenth aspect, an embodiment of this application discloses a web page display system, including:

the server according to the first aspect; and the terminal apparatus according to the second aspect.

In an optional design, the web page display system further includes:

the terminal apparatus according to the third aspect.

According to an eleventh aspect, an embodiment of this application discloses a computer-readable storage medium. The computer-readable storage medium stores instructions, and when the instructions are run on a computer, the computer is enabled to perform the web page display method according to the first aspect.

According to a twelfth aspect, an embodiment of this application discloses a computer-readable storage medium. The computer-readable storage medium stores instructions, and when the instructions are run on a computer, the computer is enabled to perform the web page display method according to the second aspect.

According to a thirteenth aspect, an embodiment of this application discloses a computer-readable storage medium. The computer-readable storage medium stores instructions, and when the instructions are run on a computer, the computer is enabled to perform the web page display method according to the third aspect.

According to a fourteenth aspect, an embodiment of this application discloses a computer-readable storage medium. The computer-readable storage medium stores instructions, and when the instructions are run on a computer, the computer is enabled to perform the web page display method in the first aspect.

According to a fifteenth aspect, an embodiment of this application discloses a computer-readable storage medium. The computer-readable storage medium stores instructions, and when the instructions are run on a computer, the computer is enabled to perform the web page display method in the second aspect.

According to a sixteenth aspect, an embodiment of this application discloses a computer-readable storage medium. The computer-readable storage medium stores instructions, and when the instructions are run on a computer, the computer is enabled to perform the web page display method in the third aspect.

Embodiments of this application provide a web page display method, an apparatus, and a system. In the method, a server not only obtains a first web page request of a first terminal apparatus, but also obtains first energy consumption information of the first terminal apparatus. In this case, after determining first web page content corresponding to the first web page request, the server may select, from first web page elements included in the first web page content, a second web page element whose needed energy consumption is not greater than energy consumption indicated by the first energy consumption information, and transmit second web page content including the second web page element to the first terminal apparatus, to enable the first terminal apparatus to display the second web page content.

In a first solution in a current technology, the server transmits all web page elements included in the first web page content to the first terminal apparatus, and correspondingly, the first terminal apparatus receives and displays all the web page elements.

However, in the solution provided in embodiments of this application, the server may transmit, to the first terminal apparatus based on the first energy consumption information fed back by the first terminal apparatus, the second web page element whose energy consumption is not greater than the energy consumption indicated by the first energy consumption information, to selectively transmit a web page element to the first terminal apparatus, and the first terminal apparatus displays the second web page content transmitted by the server. Therefore, compared with the current technology, the solution provided in embodiments of this application can reduce a quantity of web page elements received by the first terminal apparatus, and correspondingly reduce energy consumed by the first terminal apparatus to display a web page. Further, the solution reduces energy consumption of the first terminal apparatus, and therefore can further reduce a phenomenon that excessive energy consumption of the first terminal apparatus affects subsequent use of the first terminal apparatus.

In addition, in a second solution in the current technology, the first terminal apparatus receives all web page elements, determines priorities of the web page elements, and displays a web page element having a higher priority. This process also consumes a large amount of energy of the first terminal apparatus.

However, in embodiments of this application, the server selects, based on the first energy consumption information of the first terminal apparatus and energy consumption of the first web page elements, a second web page element to be transmitted to a first terminal. Therefore, the first terminal apparatus does not need to obtain all the first web page elements, and does not need to determine a priority of the first web page element, and the second web page element does not need to be selected from the first web page element based on the priority of the first web page element. Therefore, compared with the second solution in the current technology, the solution of this application can also reduce the quantity of the web page elements received by the first terminal apparatus, and correspondingly reduce the energy consumption of the first terminal apparatus. Further, this solution can also reduce the phenomenon that excessive energy consumption of the first terminal apparatus affects the subsequent use of the first terminal apparatus.

Further, in the solution in embodiments of this application, the server selects the second web page element to be transmitted to the first terminal apparatus, and after receiving the second web page content, the first terminal apparatus directly displays the second web page content. Compared with the current technology, the first terminal apparatus does not need to receive all web page elements, and does not need to select, from all the web page elements, a web page element that needs to be displayed. Therefore, the solution provided in embodiments of this application can further improve efficiency of displaying web page content by the first terminal apparatus, and improve user experience in web page browsing.

In addition, according to the solution in embodiments of this application, the server may not transmit, to the first terminal apparatus, a web page element whose energy consumption is greater than the energy consumption indicated by the first energy consumption information. In this way, an amount of data delivered by the server to the first terminal apparatus can be reduced. Therefore, load of the server can be further reduced, and load of a system including the first terminal apparatus and the server can be reduced.

DETAILED DESCRIPTION OF ILLUSTRATIVE EMBODIMENTS

Figure 1:
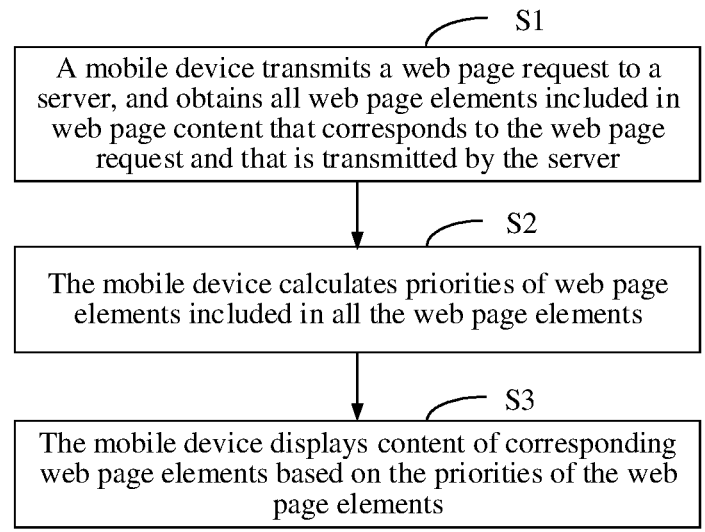
FIG. 1 is a schematic diagram of a working procedure of a web page display method disclosed in a current technology.

The following describes technical solutions in embodiments of this application with reference to accompanying drawings in embodiments of this application.

In descriptions in embodiments of this application, "/" means "or" unless otherwise specified. For example, A/B may represent A or B. In this specification, "and/or" is merely an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The following terms "first" and "second" are merely intended for a purpose of description. In the descriptions of embodiments of this application, unless otherwise stated, "a plurality of" means two or more than two.

For clear and brief description of the following embodiments, a related technology is briefly described first.

A mobile device (mobile device) may also be referred to as a handheld device (handheld device), a mobile terminal, a mobile communication terminal, or the like. Most mobile devices are pocket-sized computing devices, including a mobile phone, a notebook computer, a tablet computer, a POS machine, an in-vehicle computer, and the like. Some mobile devices (for example, a smartphone and a tablet computer that have a plurality of application functions)

usually have a small display screen and are provided with a touch input component or a small keyboard. Therefore, a user may access a web page anytime and anywhere by using these mobile devices, to obtain various information.

A mobile device (for example, a mobile phone and a tablet computer) has increasingly rich functions, and is easy to carry and hold. Therefore, a user of the mobile device is increasingly accustomed to browse a web page by using the mobile device.

Currently, to meet a requirement of a user for browsing a web page, a mobile device usually displays web page content in the following manner: First, the mobile device transmits a web page request to a server, and the web page request is used to request web page content that the user expects to browse. After receiving the web page request, the server determines the web page content corresponding to the web page request, and transmits all web page elements included in the web page content to the mobile device. After receiving the web page content that includes all the web page elements, the mobile device renders all the web page elements to display all the web page elements, to implement display of the web page content and facilitate the web page browsing by the user.

However, one web page usually includes a plurality of web page elements. When the mobile device displays the web page content by using this method, the mobile device needs to receive all the web page elements and render all the web page elements to display content of all the web page elements. In this process, the mobile device consumes a large amount of network traffic and power.

The network traffic may be referred to as traffic for short, and the network traffic consumed by the mobile device refers to data generated when the mobile device accesses the Internet. When starting software or performing an Internet operation, the mobile device usually exchanges data with the server, and the network traffic usually includes a size of the data.

In addition, refer to FIG. 1. Currently, the mobile device may further display the web page content in the following manner.

Step S1: The mobile device transmits a web page request to the server, and obtains all web page elements included in web page content corresponding to the web page request transmitted by the server.

Step S2: The mobile device calculates priorities of web page elements included in all the web page elements.

Step S3: The mobile device displays content of corresponding web page elements based on the priorities of the web page elements. In this step, the mobile device usually displays a web page element having a higher priority.

When calculating the priorities of the web page elements, the mobile device may usually determine network traffic and/or power that needs to be consumed by the mobile device to display the web page elements, and then determine the priorities of the web page elements based on the network traffic and/or power. Usually, if less network traffic and/or less power are/is consumed by the mobile device to display a web page element, the mobile device may consider that a priority of the web page element is higher. Therefore, the mobile device preferentially displays the web page element that consumes less network traffic and/or less power.

According to this solution, the mobile device may display the web page element having the higher priority, instead of displaying all the web page elements. Therefore, by using this solution, a user expects to reduce the network traffic and power consumed by the mobile device.

However, in this solution, the mobile device still needs to obtain all the web page elements, and in a process of obtaining all the web page elements, the mobile device still consumes a large amount of network traffic and power. In addition, the mobile device further needs to determine priorities of all the web page elements, and this process also consumes the network traffic and power.

Even, in some scenarios, for example, when the power of the mobile device is low, in a process in which the mobile device determines the priorities of the web page elements, the power of the mobile device is usually exhausted. Consequently, compared with the first solution, the mobile device may be powered off faster.

In other words, in the foregoing two existing solutions, although the mobile device can display the web page content and meet a requirement of the user for browsing a web page, a large amount of network traffic and power of the mobile device are consumed, and even in some cases, subsequent use of the mobile device is affected.

Currently, a mobile device usually accesses a web page by using a traffic package subscribed to by the mobile device. The traffic package is a service package provided by a carrier and includes a limitation on the network traffic. The network traffic in the traffic package is usually at a low price and is more beneficial to a user. However, if the network traffic used by the mobile device exceeds a limitation of the traffic package, a price of excess network traffic increases sharply. Therefore, the user usually expects that the network traffic used by the mobile device does not exceed the limitation of the traffic package. If the mobile device consumes a large amount of network traffic, the user needs to pay a large amount of fees.

In addition, if the mobile device consumes a large amount of power in a process of displaying the web page, the power of the mobile device is reduced, or even the mobile device is powered off. As a result, before the user charges the mobile device, the mobile device cannot be used anymore.

To resolve a problem that a large amount of network traffic and power of a mobile device are consumed by the mobile device to display web page content by using a current technology, embodiments of this application provide a web page display method, an apparatus, and a system.

Figure 2:
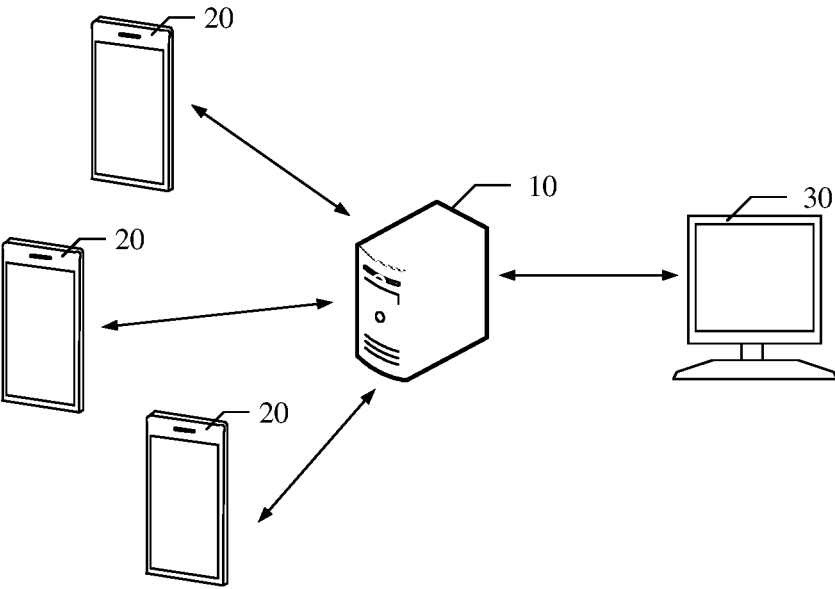
FIG. 2 is a schematic diagram of a structure of a web page display system disclosed in an embodiment of this application.

To clarify the solutions provided in embodiments of this application, FIG. 2 is provided in embodiments of this application. FIG. 2 shows a web page display system according to an embodiment of this application. The system usually includes a server 10, a first terminal apparatus 20, and a second terminal apparatus 30.

The first terminal apparatus 20 may include a mobile device, and a user may browse a web page by using the first terminal apparatus 20. To display web page content and meet a requirement of the user for browsing the web page, the first terminal apparatus 20 is connected to the server 10 through a communication network, and may transmit a web page request to the server 10. The web page request is used to request web page content that the user expects to browse.

In addition, the second terminal apparatus 30 is a terminal apparatus for publishing the web page content. The second terminal apparatus 30 is connected to the server 10 through the communication network, and may generate the web page content, and transmit the web page content to the server 10 through the communication network, to enable the server to obtain the web page content generated by the second terminal apparatus.

In this case, after receiving the web page request transmitted by the first terminal apparatus 20, the server 10 may determine, from the web page content transmitted by the second terminal apparatus 30, the web page content corresponding to the web page request, and transmit the web page content to the first terminal apparatus 20.

After receiving the web page content transmitted by the server 10, the first terminal apparatus 20 may render a web page element included in the web page content, and display, on a display screen of the first terminal apparatus 20 through rendering, the web page content including web page elements, to meet the requirement of the user for browsing the web page.

It should be noted that, the communication network may be a local area network, or may be a wide area network in which a relay (relay) device is used for transfer, or may include a local area network and a wide area network. When the communication network is a local area network, for example, the communication network may be a short-range communication network such as a Wi-Fi hotspot network, a Wi-Fi peer to peer (peer to peer, P2P) network, a Bluetooth network, a ZigBee (ZigBee) network, or a near field communication (near field communication, NFC) network. When the communication network is a wide area network, for example, the communication network may be a third-generation mobile communication technology (3rd-generation wireless telephone technology, 3G) network, a fourth-generation mobile communication technology (4th-generation mobile communication technology, 4G) network, a fifth-generation mobile communication technology (5th-generation mobile communication technology, 5G) network, a future evolved public land mobile network (public land mobile network, PLMN), or the Internet. This is not limited in this application.

In addition, it should be understood that FIG. 2 shows the web page display system only for ease of understanding, but this should not constitute any limitation on this application. The web page display system may further include more servers, or may include more terminal apparatuses. Servers that communicate with different terminal apparatuses may be the same, or may be different. Quantities of the servers that communicate with different terminal apparatuses may be the same, or may be different. This is not limited in embodiments of this application. It should be further understood that the server in the web page display system may be any device having a transceiver function or a chip that may be disposed in the device.

Further, in the solution provided in embodiments of this application, the first terminal apparatus may be a plurality of types of devices. In some embodiments, the first terminal apparatus may be a device that can display web page content, such as a mobile phone, a tablet computer, a desktop computer, a laptop computer, a notebook computer, an ultra-mobile personal computer (ultra-mobile personal computer, UMPC), a handheld computer, or a netbook. A specific form of the first terminal apparatus is not specifically limited in this application.

Figure 3:
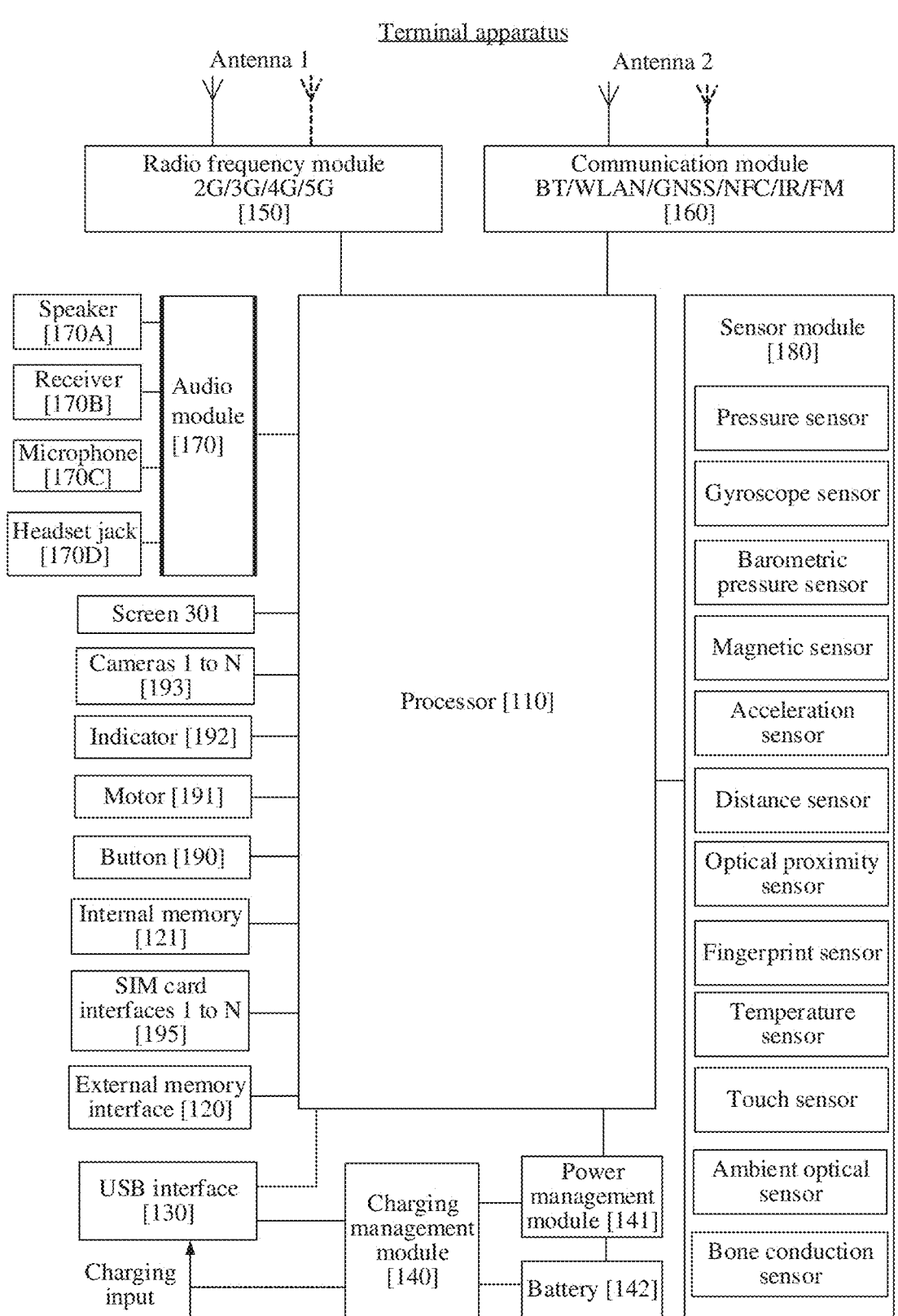
FIG. 3 is a schematic diagram of a structure of a first terminal apparatus disclosed in an embodiment of this application.

For example, the first terminal apparatus is a smartphone, and a schematic diagram of a structure of the first terminal apparatus may be shown in FIG. 3. Refer to FIG. 3. The first terminal apparatus may include a processor 110, an external memory interface 120, an internal memory 121, a universal serial bus (universal serial bus, USB) interface 130, a charging management module 140, a power management module 141, a battery 142, an antenna 1, an antenna 2, a radio frequency module 150, a communication module 160, an audio module 170, a speaker 170A, a receiver 170B, a microphone 170C, a headset jack 170D, a sensor module 180, a button 190, a motor 191, an indicator 192, a camera 193, a screen 301, a subscriber identity module (subscriber identity module, SIM) card interface 195, and the like.

It may be understood that a schematic structure in embodiments of this application does not constitute a specific limitation on the mobile phone. In some other embodiments of this application, the mobile phone may include more or fewer components than those shown in the figure, combine some components, split some components, or have different component arrangements. The components in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processor (neural-network processing unit, NPU). Different processing units may be independent components, or may be integrated into one or more processors.

The controller may be a nerve center and a command center of the mobile phone. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus that includes a serial data line (serial data line, SDA) and a serial clock line (serial clock line, SCL). In some embodiments, the processor 110 may include a plurality of groups of I2C buses. The processor no may be separately coupled to a touch sensor 180K, a charger, a flash, the camera 193, and the like through different I2C bus interfaces. For example, the processor no may be coupled to the touch sensor 180K through the I2C interface, so that the processor no communicates with the touch sensor 180K through the I2C bus interface, to implement a touch function of the mobile phone.

The I2S interface may be configured to perform audio communication. In some embodiments, the processor no may include the plurality of groups of I2S buses. The processor no may be coupled to the audio module 170 through the I2S bus, to implement communication between the processor no and the audio module 170. In some embodiments, the audio module 170 may transmit an audio signal to the communication module 160 through the I2S interface, to implement a function of answering a call through a Bluetooth headset.

The PCM interface may also be configured to perform audio communication, and sample, quantize, and encode an analog signal. In some embodiments, the audio module 170 may be coupled to the communication module 160 through a PCM bus interface. In some embodiments, the audio module 170 may alternatively transmit an audio signal to the communication module 160 through the PCM interface, to implement the function of answering a call through the Bluetooth headset. Both the I2S interface and the PCM interface may be configured to perform the audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the communication module 160. For example, the processor 110 communicates with a Bluetooth module in the communication module 160 through the UART interface, to implement a Bluetooth function. In some embodiments, the audio module 170 may transmit an audio signal to the communication module 160 through the UART interface, to implement a function of playing music through the Bluetooth headset.

The MIPI interface may be configured to connect the processor 110 to a peripheral component such as the screen 301 and the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the mobile phone. The processor 110 communicates with the screen 301 through the DSI interface, to implement a display function of the mobile phone.

The GPIO interface may be configured by software. The GPIO interface may be configured as a control signal or a data signal. In some embodiments, the GPIO interface may be configured to connect the processor 110 to the camera 193, the screen 301, the communication module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB type-C interface, or the like. The USB interface 130 may be configured to connect the charger to charge the mobile phone, or may be configured to transmit data between the mobile phone and a peripheral device. The USB interface 130 may alternatively be configured to connect a headset, to play audio through the headset. The interface may be further configured to connect another terminal apparatus, for example, an AR device.

It may be understood that an interface connection relationship between the modules shown in embodiments of this application is merely used as an example for description, and does not constitute a limitation on the structure of the mobile phone. In some other embodiments of this application, the mobile phone may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the mobile phone. When charging the battery 142, the charging management module 140 may further supply power to the terminal apparatus by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the screen 301, the camera 193, the communication module 160, and the like. The power management module 141 may be further configured to monitor parameters such as a battery capacity, a battery cycle count, and a battery health status (power leakage or impedance). In some other embodiments, the power management module 141 may also be disposed in the processor 110. In some other embodiments, the power management module 141 and the charging management module 140 may alternatively be disposed in a same component.

A wireless communication function of the mobile phone may be implemented by using the antenna 1, the antenna 2, the radio frequency module 150, the communication module 160, the modem processor, the baseband processor, and the like.

The antenna 1 and the antenna 2 are configured to transmit and receive an electromagnetic wave signal. Each antenna in the mobile phone may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The radio frequency module 150 may provide a solution, applied to the mobile phone, to wireless communication including 2G, 3G, 4G, 5G, and the like. The radio frequency module 150 may include at least one filter, a switch, a power amplifier, a low noise amplifier (low noise amplifier, LNA), and the like. The radio frequency module 150 may receive an electromagnetic wave through the antenna 1, perform processing such as filtering and amplification on the received electromagnetic wave, and transfer the electromagnetic wave to the modem processor for demodulation. The radio frequency module 150 may further amplify a signal modulated by the modem processor, and convert the signal into an electromagnetic wave for radiation through the antenna 1. In some embodiments, at least some functional modules of the radio frequency module 150 may be disposed in the processor 110. In some embodiments, at least some functional modules of the radio frequency module 150 and at least some modules of the processor 110 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, and the like), or displays an image or a video through the screen 301. In some embodiments, the modem processor may be an independent component. In some other embodiments, the modem processor may be independent of the processor 110, and is disposed in a same component as the radio frequency module 150 or another functional module.

The communication module 160 may provide a solution, applied to the mobile phone, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The communication module 160 may be one or more components integrating at least one communication processor module. The communication module 160 receives an electromagnetic wave through the antenna 2, performs frequency modulation and filtering processing on an electromagnetic wave signal, and sends a processed signal to the processor 110. The communication module 160 may further receive a to-be-sent signal from the processor 110, perform frequency modulation and amplification on the signal, and convert the signal into an electromagnetic wave for radiation through the antenna 2.

In some embodiments, in the mobile phone, the antenna 1 and the radio frequency module 150 are coupled, and the antenna 2 and the communication module 160 are coupled, so that the mobile phone can communicate with a network and another device by using a wireless communication technology. The wireless communication technology may include a global system for mobile communications (global system for mobile communications, GSM) technology, a general packet radio service (general packet radio service, GPRS) technology, a code division multiple access (code division multiple access, CDMA) technology, a wideband code division multiple access (wideband code division multiple access, WCDMA) technology, a time-division code division multiple access (time-division code division multiple access, TD-SCDMA) technology, a long term evolution (long term evolution, LTE) technology, a BT technology, a GNSS technology, a WLAN technology, an NFC technology, an FM technology, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The mobile phone implements a display function by using the GPU, the screen 301, the application processor, and the like. The GPU is a microprocessor for image processing, and is connected to the screen 301 and the application processor. The GPU is configured to perform mathematical and geometric calculation, and render an image. The processor 110 may include one or more GPUs, which execute program instructions to generate or change display information. In this embodiment of this application, the screen 301 may include a display and a touch component. The display is configured to output display content to the user, and the touch component is configured to receive a touch event input by the user on the screen 301.

In the mobile phone, the sensor module 180 may include one or more of a gyroscope sensor, an acceleration sensor, a pressure sensor, a barometric pressure sensor, a magnetic sensor (for example, a Hall sensor), a distance sensor, an optical proximity sensor, a fingerprint sensor, a temperature sensor, a touch sensor, a pyroelectric infrared sensor, an ambient optical sensor, a bone conduction sensor, and the like. This is not limited in embodiments of this application.

The mobile phone may implement a photographing function by using the ISP, the camera 193, the video codec, the GPU, a flexible display 301, the application processor, and the like.

The ISP is configured to process data fed back by the camera 193. For example, during photographing, a shutter opens, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on a noise, brightness, and a complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the mobile phone may include one or N cameras 193, where N is a positive integer greater than 1.

The digital signal processor is configured to process a digital signal, and may process another digital signal in addition to the digital image signal. For example, when the mobile phone selects a frequency, the digital signal processor is configured to perform Fourier transform on frequency energy, and the like.

The video codec is used to compress or decompress a digital video. The mobile phone may support one or more types of video codecs. In this way, the mobile phone may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the mobile phone, for example, image recognition, facial recognition, speech recognition, and text understanding, may be implemented by using the NPU.

The external memory interface 120 may be configured to connect an external memory card, for example, a Micro SD card, to extend a storage capability of the mobile phone. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the mobile phone. The internal memory 121 may include a program storage area and a data storage area. The program storage area may store an operating system, an application program needed by at least one function (for example, a sound playing function or an image playing function), and the like. The data storage area may store data (for example, audio data and an address book) created during use of the mobile phone, and the like. In addition, the internal memory 121 may include a high-speed random access memory, and may further include a nonvolatile memory, for example, at least one magnetic disk storage device, a flash memory device, or a universal flash storage (universal flash storage, UFS).

The mobile phone may implement an audio function by using the audio module 170, the speaker 170A, the receiver 170B, the microphone 170C, the headset jack 170D, the application processor, and the like. For example, the audio function includes determining a network standard, recording, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The mobile phone may be used to listen to music or answer a hands-free call by using the speaker 170A.

The receiver 170B, also referred to as an "earpiece", is configured to convert an audio electrical signal into a sound signal. When the mobile phone is used to answer a call or voice information, the receiver 170B may be put close to a human ear to listen to a voice.

The microphone 170C, also referred to as a "mike" or a "mic", is configured to convert a sound signal into an electrical signal. When making a call or sending voice information, the user may make a sound near the microphone 170C through the mouth of the user, to input a sound signal to the microphone 170C. At least one microphone 170C may be disposed in the mobile phone. In some other embodiments, two microphones 170C may be disposed in the mobile phone, to collect a sound signal and further implement a noise reduction function. In some other embodiments, three, four, or more microphones 170C may alternatively be disposed in the mobile phone, to collect a sound signal, implement noise reduction, identify a sound source, implement a directional recording function, and the like.

The headset jack 170D is configured to connect a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The button 190 includes a power button, a volume button, and the like. The button 190 may be a mechanical button, or may be a touch button. The mobile phone may receive a button input, and generate a button signal input related to a user setting and function control of the mobile phone.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the flexible display 301. Different application scenarios (for example, a time reminder, information receiving, an alarm clock, and a game) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to connect a SIM card. The SIM card may be inserted into the SIM card interface 195 or removed from the SIM card interface 195, to implement contact with or separation from the mobile phone. The mobile phone may support one or N SIM card interfaces, where N is a positive integer greater than 1. The SIM card interface 195 may support a nano SIM card, a micro SIM card, a SIM card, and the like. A plurality of cards may be inserted into a same SIM card interface 195 at the same time. Types of the plurality of cards may be the same or different. The SIM card interface 195 may also be compatible with different types of SIM cards. The SIM card interface 195 may also be compatible with an external memory card. The mobile phone interacts with a network by using the SIM card, to implement functions such as calling and data communication. In some embodiments, the mobile phone uses an eSIM, namely, an embedded SIM card. The eSIM card may be embedded in the mobile phone, and cannot be separated from the mobile phone.

In addition, an operating system runs on the foregoing components, for example, an iOS operating system developed by Apple, an Android Android open-source operating system developed by Google, and a Windows operating system developed by Microsoft. An application may be installed and run on the operating system.

To clarify the solutions provided in this application, the following describes the solutions provided in this application with reference to embodiments and the accompanying drawings.

Figure 4:
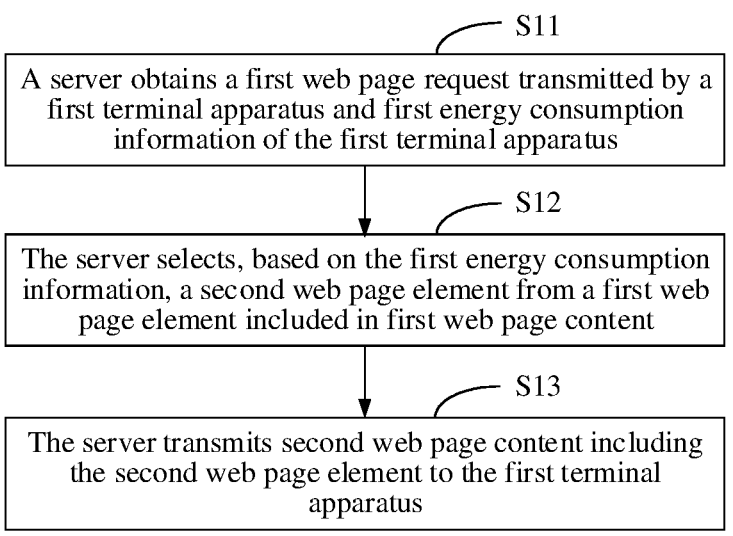
FIG. 4 is a schematic diagram of a working procedure of a web page display method disclosed in an embodiment of this application.

Refer to a schematic diagram of a working procedure shown in FIG. 4. A web page display method provided in an embodiment of this application includes the following steps.

Step S11: A server obtains a first web page request transmitted by a first terminal apparatus and first energy consumption information of the first terminal apparatus.

In this embodiment of this application, the first terminal apparatus is a terminal apparatus that needs to display web page content. The first terminal apparatus may include a mobile device. In addition, the first terminal apparatus may further include another device other than the mobile device. The another device usually has a limitation on energy consumed by the another device, and the energy may include network traffic, power, and/or like.

The first energy consumption information may represent a limitation of the first terminal apparatus on energy consumption of the first terminal apparatus. In the solution provided in this embodiment of this application, energy consumption of web page elements transmitted by the server to the first terminal apparatus is usually not greater than energy consumption indicated by the first energy consumption information.

The first energy consumption information of the first terminal apparatus may include at least one of first network traffic information of the first terminal apparatus and first power information of the first terminal apparatus.

In addition, the first energy consumption information of the first terminal apparatus may be implemented in a plurality of forms. In a feasible form, the first energy consumption information includes an energy consumption value. In this case, if the first energy consumption information includes the first network traffic information, the first network traffic information may include a network traffic value. Alternatively, if the first energy consumption information includes the first power information, the first power information may include a power value.

Alternatively, in a feasible form, the energy consumption may be classified, and the first energy consumption information includes an energy consumption level. In this case, if the first energy consumption information of the first terminal apparatus includes the first network traffic information, the first energy consumption information includes a network traffic level of the first terminal apparatus. The network traffic level of the first terminal apparatus may indicate an applicable network traffic level of the first terminal apparatus. If the first energy consumption information of the first terminal apparatus includes the first power information, the first energy consumption information includes a power level of the first terminal apparatus. The power level of the first terminal apparatus may indicate an applicable power level of the first terminal apparatus.

For example, the network traffic may be classified into nine levels ranging from 1 to 9, and an identifier of the network traffic level (namely, a data flow cost level) may be referred to as dfcLvl for short. A higher value represents a higher network traffic level. In addition, the power may be classified into nine levels ranging from 1 to 9, and an identifier of the power level (namely, a power saving level) may be referred to as psLvl for short. A higher value represents a higher power level.

Certainly, the network traffic and the power may be further classified in another manner. This is not limited in this embodiment of this application.

In a feasible implementation, the first energy consumption information may be loaded into the first web page request. In a feasible example, the first web page request is set as "https://www.a.b.c/test.html?", and the first energy consumption information includes the network traffic level and the power level. The network traffic level is 9 and the power level is 1, and the first web page request loaded with the first energy consumption information may be "https://www.a.b.c/test.html? psLvl=9&dfcLvl=1".

Alternatively, in another feasible implementation, the first energy consumption information and the first web page request may be two pieces of information. The two pieces of information may be packed into one data packet by the first terminal apparatus, and the first terminal apparatus transmits the data packet to the server.

Certainly, the first terminal apparatus may further transmit the first web page request and the first energy consumption information of the first terminal apparatus to the server in another manner. This is not limited in this embodiment of this application.

Step S12: The server selects, based on the first energy consumption information, a second web page element from a first web page element included in first web page content. The first web page content is web page content corresponding to the first web page request, and energy consumption needed by the second web page element is not greater than energy consumption indicated by the first energy consumption information.

A web page usually includes at least one web page element, and the web page element usually includes a text, an image, a hyperlink, an interactive button, a web page advertisement, and the like.

In this embodiment of this application, the web page content corresponding to the first web page request is set as the first web page content, and a web page element included in the first web page content is the first web page element. In this case, the server selects, based on the first energy consumption information, the second web page element that meets a requirement of energy consumption of the first terminal apparatus from the first web page element.

In this step, the energy consumption of the second web page element determined by the server is usually not greater than the energy consumption indicated by the first energy consumption information. In other words, the second web page element that meets the requirement of the energy consumption of the first terminal apparatus is a web page element that is in the first web page element and that has energy consumption not greater than the energy consumption indicated by the first energy consumption information.

In embodiments of this application, energy consumption of a web page element refers to energy that needs to be consumed by a terminal apparatus to display the web page element. If the energy consumption includes the network traffic, network traffic that needs to be consumed by the first terminal apparatus to display the second web page element is not greater than network traffic indicated by the first energy consumption information. If the energy consumption includes the power, power that needs to be consumed by the first terminal apparatus to display the second web page element is not greater than power indicated by the first energy consumption information. If the energy consumption includes the network traffic and the power, the network traffic that needs to be consumed by the first terminal apparatus to display the second web page element is not greater than the network traffic indicated by the first energy consumption information, and the power that needs to be consumed by the first terminal apparatus to display the second web page element is not greater than the power indicated by the first energy consumption information.

In other words, in this embodiment of this application, if the first energy consumption information of the first terminal apparatus includes the first network traffic information of the first terminal apparatus, the network traffic needed by the first terminal apparatus to display the second web page element is not greater than the network traffic indicated by the first network traffic information. If the first energy consumption information of the first terminal apparatus includes the first power information of the first terminal apparatus, the power needed by the first terminal apparatus to display the second web page element is not greater than the power indicated by the first power information.

In addition, in this embodiment of this application, the first energy consumption information may be implemented in a plurality of forms, and correspondingly, the server may determine the second web page element in the first web page element in a plurality of manners.

In a feasible manner, the first energy consumption information includes the energy consumption value. In this step, when selecting the second web page element from the first web page element, the server may determine an energy consumption value of the first web page element, and then determine the second web page element based on energy consumption values of first web page elements and the energy consumption value included in the first energy consumption information.

For example, if the first energy consumption information includes the network traffic value, network traffic that needs to be consumed when the first web page element is displayed is determined, and then the second web page element in the first web page element is determined accordingly. The network traffic value that needs to be consumed when the second web page element is displayed is not greater than the network traffic value included in the first energy consumption information.

In another feasible manner, if the first energy consumption information includes the energy consumption level, the server may determine energy consumption levels of the first web page elements, and then determine the second web page element in the first web page element based on the energy consumption level included in the first energy consumption information and the energy consumption level of the first web page element.

If the first energy consumption information includes the network traffic level, and a higher network traffic level represents that more network traffic is consumed, a network traffic level of the second web page element is not greater than the network traffic level included in the first energy consumption information. If the first energy consumption information includes the power level, and a higher power level represents that more energy is saved, in other words, less power is consumed, a power level of the second web page element is not less than the power level included in the first energy consumption information.

Step S13: The server transmits second web page content including the second web page element to the first terminal apparatus.

In this embodiment of this application, after determining the second web page element, the server may transmit the second web page content including the second web page element to the first terminal apparatus. After receiving the second web page content, the first terminal apparatus may display the second web page content, to meet a requirement of a user for browsing a web page.

The second web page content may include only the second web page element. Alternatively, the second web page content may include the second web page element and n first web page elements. The n first web page elements are different from the second web page element in the second web page content, and n is a small positive integer, so that the second web page content includes a few first web page elements except the second web page element, or a sum of the energy consumption of the second web page element and energy consumption of the n first web page elements included in the second web page content is less than specified energy consumption. This ensures that energy consumed by the first terminal apparatus in a process of displaying the second web page content is less than the specified energy consumption, and avoids that the first terminal apparatus consumes much energy in the process of displaying the second web page content.

In this case, if the energy consumption indicated by the first energy consumption information is large, or energy consumption needed by the first web page elements included in the first web page content is small, the second web page content may be the same as the first web page content.

In addition, if the energy consumption indicated by the first energy consumption information is small, or energy consumption needed by some first web page elements is large, the server may filter out the first web page element whose energy consumption is large, so that energy consumption needed when the second web page content is displayed is less than energy consumption needed when the first web page content is displayed.

Embodiments of this application provide a web page display method. In the method, the server not only obtains the first web page request of the first terminal apparatus, but also obtains the first energy consumption information of the first terminal apparatus. In this case, after determining the first web page content corresponding to the first web page request, the server may select, from the first web page elements included in the first web page content, the second web page element whose needed energy consumption is not greater than the energy consumption indicated by the first energy consumption information, and transmit the second web page content including the second web page element to the first terminal apparatus, to enable the first terminal apparatus to display the second web page content.

In a first solution in the current technology, the server transmits all web page elements included in the first web page content to the first terminal apparatus, and correspondingly, the first terminal apparatus receives and displays all the web page elements.

However, in the solution provided in embodiments of this application, the server may transmit, to the first terminal apparatus based on the first energy consumption information fed back by the first terminal apparatus, the second web page element whose energy consumption is not greater than the energy consumption indicated by the first energy consumption information, to selectively transmit a web page element to the first terminal apparatus, and the first terminal apparatus displays the second web page content transmitted by the server. Therefore, compared with the current technology, the solution provided in embodiments of this application can reduce a quantity of web page elements received by the first terminal apparatus, and correspondingly reduce energy consumed by the first terminal apparatus to display a web page. Further, the solution reduces energy consumption of the first terminal apparatus, and therefore can further reduce a phenomenon that excessive energy consumption of the first terminal apparatus affects subsequent use of the first terminal apparatus.

In addition, in a second solution in the current technology, the first terminal apparatus receives all the web page elements, determines priorities of the web page elements, and displays a web page element having a higher priority. This process also consumes a large amount of energy of the first terminal apparatus.

However, in embodiments of this application, the server selects, based on the first energy consumption information of the first terminal apparatus and energy consumption of the first web page elements, a second web page element to be transmitted to a first terminal. Therefore, the first terminal apparatus does not need to obtain all first web page elements, and does not need to determine a priority of the first web page element, and the second web page element does not need to be selected from the first web page element based on the priority of the first web page element. Therefore, compared with the second solution in the current technology, the solution of this application can also reduce the quantity of the web page elements received by the first terminal apparatus, and correspondingly reduce the energy consumption of the first terminal apparatus. Further, this solution can also reduce the phenomenon that excessive energy consumption of the first terminal apparatus affects the subsequent use of the first terminal apparatus.

Further, in the solution in embodiments of this application, the server selects the second web page element to be transmitted to the first terminal apparatus, and after receiving the second web page content, the first terminal apparatus directly displays the second web page content. Compared with the current technology, the first terminal apparatus does not need to receive all the web page elements, and does not need to select, from all the web page elements, a web page element that needs to be displayed. Therefore, the solution provided in embodiments of this application can further improve efficiency of displaying web page content by the first terminal apparatus, and improve user experience in web page browsing.

In addition, according to the solution in embodiments of this application, the server may not transmit, to the first terminal apparatus, a web page element whose energy consumption is greater than the energy consumption indicated by the first energy consumption information. In this way, an amount of data delivered by the server to the first terminal apparatus can be reduced. Therefore, load of the server can be further reduced, and load of a system including the first terminal apparatus and the server can be reduced.

In the solution provided in this embodiment of this application, the server needs to select the second web page element from the first web page element based on the first energy consumption information. This operation may be implemented in a plurality of manners.

In a feasible manner, that the server selects, based on the first energy consumption information, the second web page element from the first web page element included in the first web page content includes the following steps.

The server selects the second web page element from the first web page element based on energy consumption information of the first web page element transmitted by a second terminal apparatus and based on the first energy consumption information.

In this embodiment of this application, the second terminal apparatus is a publisher of the second web page content. The second terminal apparatus may generate corresponding web page content based on an operation of web page operation personnel, and transmit the web page content generated by the second terminal apparatus to the server. The server may obtain the web page content transmitted by the second terminal apparatus, and determine, based on the first web page request and from the web page content obtained by the server, the first web page content corresponding to the first web page request.

In this case, the second terminal apparatus may further determine energy consumption information of the first web page elements included in the first web page content, and transmit the energy consumption information of the first web page element to the server, so that the server obtains the energy consumption information of the first web page element based on transmission of the second terminal apparatus.

In a feasible design, the energy consumption information of the first web page element may be loaded into the first web page content. In this case, after receiving the first web page content transmitted by the second terminal apparatus, the server may determine the energy consumption information of the first web page element.

The energy consumption information of the first web page element may include an energy consumption value. In this case, the energy consumption values of the first web page elements may be loaded into the first web page content. Alternatively, the energy consumption may be further classified into different levels, and the energy consumption information of the first web page element includes the energy consumption level of the first web page element. In this case, the energy consumption levels of the first web page elements may be loaded into the first web page content.

For example, if energy consumption information of a web page element includes an energy consumption level of the web page element, and the energy consumption information of the web page element is loaded into corresponding web page content, a piece of web page content generated by the second terminal apparatus may be shown as follows:

```
"<html>
<head>
<title psLvl=9 dfcLvl=1>My first HTML page</title>
</head>
<body>
<p psLvl=9 dfcLvl=1>Content of a body element is displayed in a
browser. </p>
<p psLvl=9 dfcLvl=1>Content of a title element is displayed in the title
bar of the browser. </p>
<img src="url" psLvl=5 dfcLvl=5>abc.img</ img>
<svg psLvl=4 dfcLvl=4 xmlns="http://www.w3.org/2000/svg"
version="1.1" height="190">
<polygon psLvl=4 dfcLvl=4 points="100,10 40,180 190,60 10,60
160,180" style="fill:lime;stroke:purple;stroke-width:5;fill-
rule:evenodd;" />
</svg>
</body>
</html>".
```

In this example, the network traffic may be classified into nine levels ranging from 1 to 9, and the identifier of the network traffic level (namely, the data flow cost level) may be referred to as dfcLvl for short. In addition, the power may be classified into nine levels ranging from 1 to 9, and the identifier of the power level (namely, the power saving level) may be referred to as psLvl for short.

In the web page content described in the foregoing example, the third row represents a web page element, and "psLvl=9 dfcLvl=1" is loaded into this row, representing that a power level of the web page element is 9 and a network traffic level of the web page element is 1. The sixth row represents a web page element, and "psLvl=9 dfcLvl=1" is loaded into this row, representing that a power level of the web page element is 9 and a network traffic level of the web page element is 1. The seventh row represents a web page element, and "psLvl=9 dfcLvl=1" is loaded into this row, representing that a power level of the web page element is 9 and a network traffic level of the web page element is 1. The eighth row represents a web page element, and "psLvl=5 dfcLvl=5" is loaded into this row, representing that a power level of the web page element is 5 and a network traffic level of the web page element is 5. The ninth row represents a web page element, and "psLvl=4 dfcLvl=4" is loaded into this row, representing that a power level of the web page element is 4 and a network traffic level of the web page element is 4. The tenth row represents a web page element, and "psLvl=4 dfcLvl=4" is loaded into this row, representing that a power level of the web page element is 4 and a network traffic level of the web page element is 4.

In addition, the second terminal apparatus publishes the web page content in the foregoing example to the server, and sets a published website address as "https://www.a.b.c/test.html". In this case, when the first web page request obtained by the server includes the website address, it may be determined that the web page content in the foregoing example is the first web page content corresponding to the first web page request. For example, if the first terminal apparatus loads the first energy consumption information into the first web page request, and the first web page request received by the server is "https://www.a.b.c/test.html?psLvl=9&dfcLvl=1", it may be determined that the web page content in the foregoing example is the first web page content corresponding to the first web page request, and that "psLvl=9&dfcLvl=1" is the first energy consumption information of the first terminal apparatus.

In the solution provided in this embodiment of this application, the second terminal apparatus determines the energy consumption information of the first web page elements, and provides the energy consumption information of the first web page element to the server. The server determines the second web page element based on the energy consumption information that is of the first web page element and that is determined by the second terminal apparatus.

In addition, because the energy consumption needed by the second web page element is not greater than the energy consumption indicated by the first energy consumption information, if the first web page content is shown in the foregoing example, and the first energy consumption information is "psLvl=9&dfcLvl=1", the server may determine the second web page element based on the energy consumption information of the first web page elements loaded into the first web page content and the first energy consumption information.

It is set in this embodiment of this application that, if the first energy consumption information includes the network traffic level, and a higher network traffic level represents that more network traffic is consumed, the network traffic level of the second web page element is not greater than the network traffic level included in the first energy consumption information. If the first energy consumption information includes the power level, and a higher power level represents that more energy is saved, in other words, less power is consumed, the power level of the second web page element is not less than the power level included in the first energy consumption information. In addition, in this example, the network traffic is classified into nine levels ranging from 1 to 9. In this way, it may be determined that a web page element whose psLvl is equal to 9 is the most energy-saving (namely, the most power-saving) web page element, and that a web page element whose dfcLvl is equal to 1 is the most traffic-saving web page element.

Further, the server may determine, based on the first energy consumption information (namely, "psLvl=9&dfcLvl=1"), requirements of the first terminal apparatus on power consumption and network traffic consumption, may determine that power consumed by a first web page element whose power level is lower than psLvl=9 exceeds the requirement of the first terminal apparatus, where the first web page element is not the second web page element, and may determine that web page traffic consumed by a first web page element whose network traffic level is higher than dfcLvl=1 exceeds the requirement of the first terminal apparatus, and the first web page element is not the second web page element. In other words, the server may determine that a first web page element whose power level is not lower than psLvl=9 and whose network traffic level is not higher than dfcLvl=1 is the second web page element.

In this case, the second web page content transmitted by the server to the first terminal apparatus may be as follows:

```
"<html>
<head>
<title psLvl=9 dfcLvl=1>My first HTML page</title>
</head>
<body>
<p psLvl=9 dfcLvl=1>Content of a body element is displayed in a
browser. </p>
     <p psLvl=9 dfcLvl=1>Content of a title element is displayed in the
title bar of the browser. </p>
</body>
   </html>".
```

In the second web page content, the power level of the included second web page element is not lower than psLvl=9, and the network traffic level of the included second web page element is not higher than dfcLvl=1. This meets the requirement of the energy consumption of the first terminal apparatus.

Figure 5:
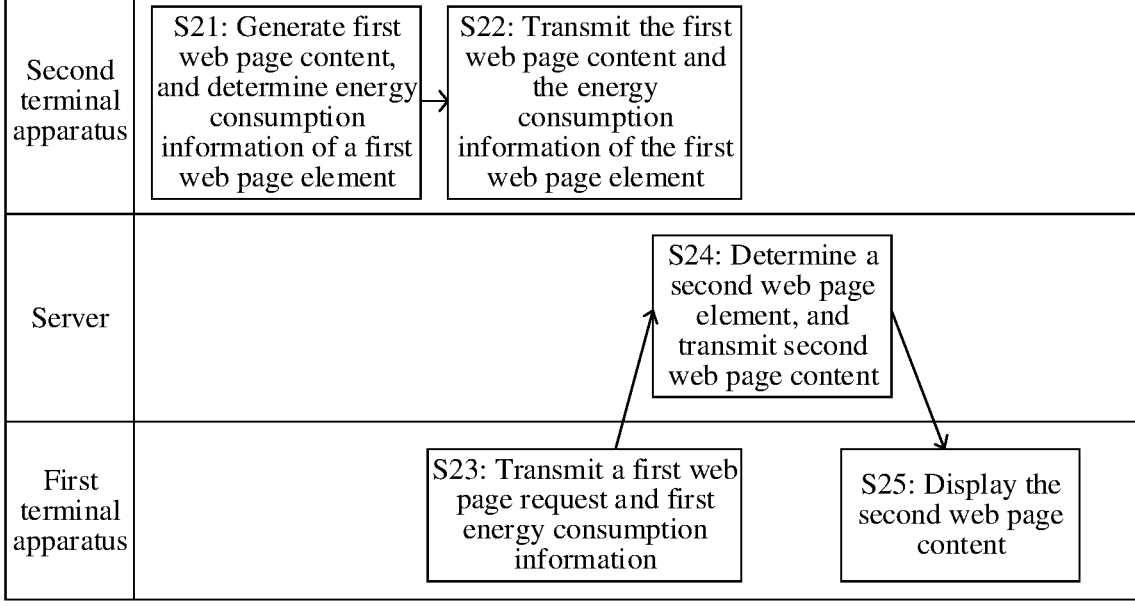
FIG. 5 is a schematic diagram of a working procedure of another web page display method disclosed in an embodiment of this application.

To clarify operations performed by the apparatuses in this solution, FIG. 5 is disclosed below. Refer to a schematic diagram of a working procedure shown in FIG. 5. The solution provided in this embodiment of this application includes the following steps.

Step S21: A second terminal apparatus generates first web page content, and determines energy consumption information of a first web page element included in the first web page content.

In a feasible implementation, the energy consumption information of the first web page element may be loaded into the first web page content.

Step S22: The second terminal apparatus transmits the first web page content and the energy consumption information of the first web page element to a server.

According to this step, the server may obtain the first web page content and the energy consumption information of the first web page element, and the second terminal apparatus implements publishing of the first web page content.

Step S23: A first terminal apparatus determines a first web page request and first energy consumption information of the first terminal apparatus, and transmits the first web page request and the first energy consumption information to the server.

The first terminal apparatus may usually generate the first web page request based on a requirement of a user for browsing a web page. In addition, the first energy consumption information may be loaded into the first web page request.

Step S24: The server determines, based on the first web page request, first web page content corresponding to the first web page request, and selects, based on the first energy consumption information, a second web page element from the first web page element included in the first web page content. Then, the server transmits second web page content including the second web page element to the first terminal apparatus.

Energy consumption needed by the second web page element is not greater than energy consumption indicated by the first energy consumption information.

Step S25: The first terminal apparatus receives the second web page content transmitted by the server, and displays the second web page content.

Figures 6, 7:
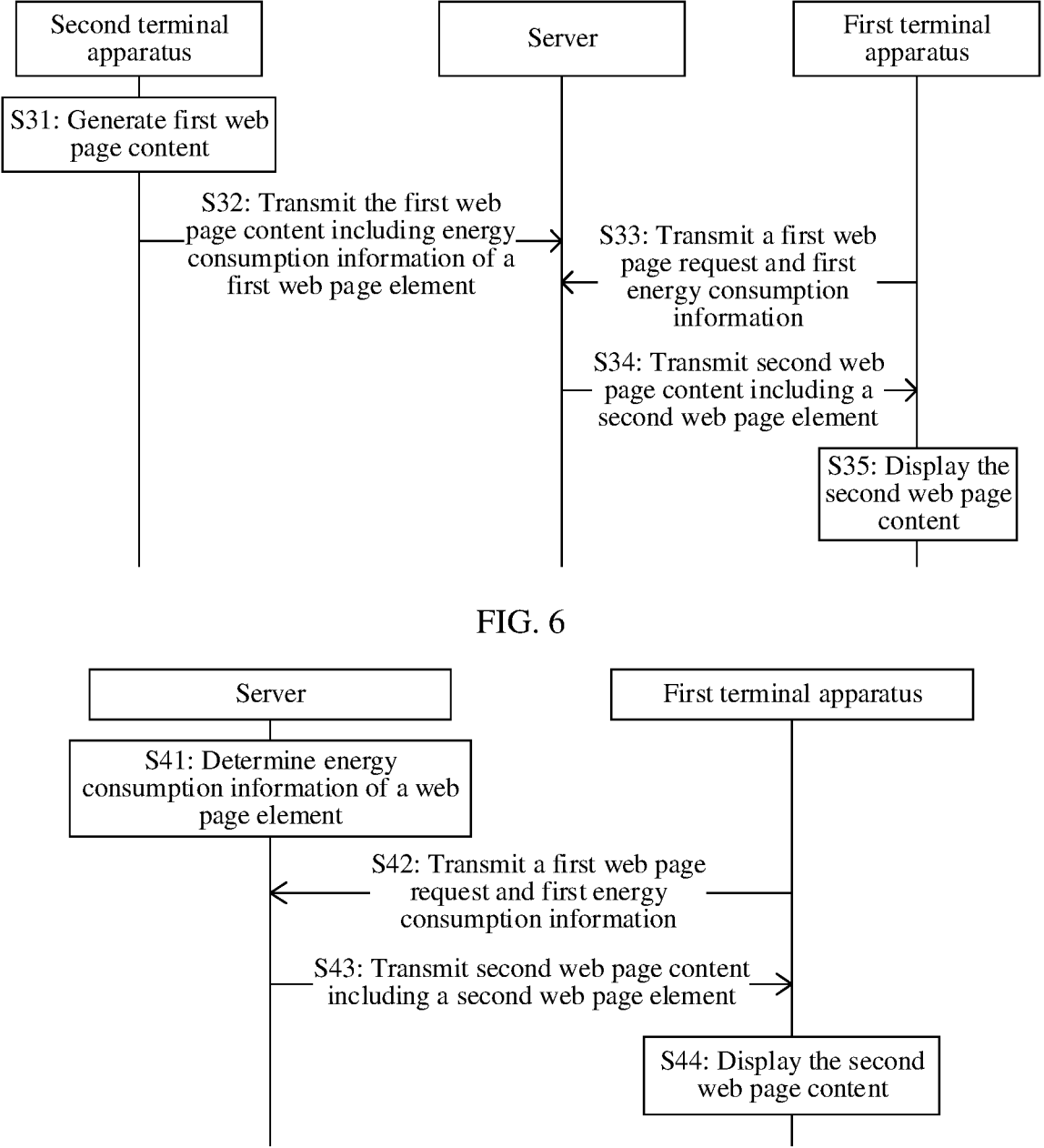
FIG. 6 is a schematic diagram of a working procedure of another web page display method disclosed in an embodiment of this application.
FIG. 7 is a schematic interaction diagram of a web page display method disclosed in an embodiment of this application.

Further, to clarify the solution provided in this embodiment of this application, FIG. 6 is further provided. In an example shown in FIG. 6, energy consumption information of a first web page element is loaded into first web page content.

Refer to FIG. 6. The solution provided in this embodiment of this application includes the following steps.

Step S31: A second terminal apparatus generates first web page content, and the first web page content includes energy consumption information of a first web page element.

Step S32: The second terminal apparatus transmits the first web page content including the energy consumption information of the first web page element to a server.

After obtaining the first web page content, the server may further generate a website address corresponding to the first web page content. In a feasible implementation, the website address may be represented as a uniform resource locator system (uniform resource locator, URL) link.

Step S33: A first terminal apparatus transmits a first web page request and first energy consumption information of the first terminal apparatus to the server.

In a feasible implementation, the first web page request may be represented in a form of a URL link. In addition, if the first energy consumption information may be loaded into the first web page request, the URL link further includes the first energy consumption information.

Step S34: The server selects, based on the first energy consumption information, a second web page element from the first web page element included in the first web page content, and transmits second web page content including the second web page element to the first terminal apparatus.

Step S35: The first terminal apparatus displays the second web page content.

According to the solution in this embodiment of this application, the server may determine the energy consumption information of the first web page element based on transmission of the second terminal apparatus, and further determine the second web page element based on the energy consumption information of the first web page element, to transmit the second web page content including the second web page element to the first terminal apparatus. In this solution, energy consumption of the first terminal apparatus can be reduced. In addition, in this solution, because the second terminal apparatus determines energy consumption information of the first web page elements, and the server selects the second web page element from the first web page element, the first terminal apparatus does not need to process the received second web page content, but directly displays the second web page content. In this way, efficiency of displaying web page content by the first terminal apparatus is improved and user experience in web page browsing is improved.

Alternatively, in another embodiment, that the server selects, based on the first energy consumption information, a second web page element from the first web page element included in the first web page content includes the following steps.

First, the server determines energy consumption information of the first web page element.

Then, the server selects the second web page element from the first web page element based on the energy consumption information of the first web page element determined by the server and the first energy consumption information.

The server may determine the energy consumption information of the first web page element based on the energy that needs to be consumed in a process of displaying the first web page element by the first terminal apparatus. In addition, the energy consumption information of the first web page element determined by the server may include an energy consumption value of the first web page element, or the energy consumption information of the first web page element determined by the server may include an energy consumption level of the first web page element.

In this solution, the second terminal apparatus does not need to determine the energy consumption information of the first web page element. The server determines the energy consumption information of the first web page element. In this case, after receiving the first web page request and the first energy consumption information, the server may select the second web page element from the first web page element based on the energy consumption information that is of the first web page element and that is determined by the server.

According to this solution, the server may still determine the second web page element, and selectively transmit a web page element to the first terminal apparatus. Therefore, a quantity of web page elements transmitted by the server to the first terminal apparatus may be reduced, load of the server may be reduced, and bandwidth may be saved.

In addition, in this solution, the first terminal apparatus does not need to receive all web page elements or display content of all the web page elements, which reduces energy consumption of the first terminal apparatus.

Further, in this solution, the server determines energy consumption information of the first web page elements, and selects the second web page element from the first web page element. Therefore, the first terminal apparatus does not need to process the received second web page content, but directly displays the second web page content. In this way, efficiency of displaying web page content by the first terminal apparatus is improved and user experience in web page browsing is improved.

In addition, in the solution provided in this embodiment of this application, the server may determine the energy consumption information of the first web page element after receiving the first web page request.

Alternatively, in another feasible implementation, the server may determine the energy consumption information of the web page elements included in the web page content after receiving the web page content transmitted by the second terminal apparatus. In other words, before receiving the first web page request, the server has determined energy consumption information of the first web page element included in the first web page content in advance. In this case, after receiving the first web page request, the server may determine the corresponding first web page content based on the first web page request, and determine the energy consumption information of the first web page element based on a pre-operation.

To clarify this solution, the following discloses an example. In this example, the first energy consumption information includes both first network traffic information and first power information. In addition, in this example, network traffic is classified into nine levels ranging from 1 to 9, and an identifier of the network traffic level (namely, a data flow cost level) may be referred to as dfcLvl for short. In addition, power is classified into nine levels ranging from 1 to 9, and an identifier of the power level (namely, a power saving level) may be referred to as psLvl for short.

Correspondingly, in this example, the energy consumption information of the first web page element includes a network traffic level of the first web page element and an electricity level of the first web page element. If a higher network traffic level represents that more network traffic is consumed, a network traffic level of the second web page element is not greater than a network traffic level included in the first energy consumption information. If a higher power level represents that more energy is saved, in other words, less power is consumed, a power level of the second web page element is not less than a power level included in the first energy consumption information.

In this case, it is set that in this example, the first web page content transmitted by the second terminal apparatus to the server is shown as follows:

```
"<html>
<head>
<title >My first HTML page</title>
</head>
<body>
<p>Content of a body element is displayed in a browser. </p>
<p>Content of a title element is displayed in the title bar of the browser. </p>
<img src="url">abc.img</ img>
<svg xmlns="http://www.w3.org/2000/svg" version="1.1" height="190">
    <polygon points="100,10 40,180 190,60 10,60 160,180"
        style="fill:lime;stroke:purple;stroke-width:5;fill-rule:evenodd;" />
</svg>
</body>
</html>".
```

After receiving the first web page content, the server may further determine the website address of the first web page content. In this example, the website address is "https://www.a.b.c/test.html?".

In addition, after receiving the first web page content, the server may further determine the energy consumption information of the first web page elements included in the first web page content. In this example, after determining the energy consumption information of the first web page element, the server may load the energy consumption information into the first web page content, and the first web page content loaded with the energy consumption information may be shown as follows:

```
"<html>
<head>
<title psLvl=9 dfcLvl=1>My first HTML page</title>
</head>
<body>
<p psLvl=9 dfcLvl=1>Content of a body element is displayed in a
browser. </p>
<p psLvl=9 dfcLvl=1>Content of a title element is displayed in the title
bar of the browser. </p>
<img src="url" psLvl=5 dfcLvl=5>abc.img</ img>
<svg  psLvl=4  dfcLvl=4  xmlns="http://www.w3.org/2000/svg"
version="1.1" height="190">
    <polygon psLvl=4 dfcLvl=4 points="100,10 40,180 190,60 10,60
        160,180" style="fill:lime;stroke:purple;stroke-width:5;fill-
        rule:evenodd;" />
</svg>
</body>
    </html>".
```

The server may further receive the first web page request transmitted by the first terminal apparatus and the first energy consumption information of the first terminal apparatus. The first energy consumption information may be loaded into the first web page request. In this case, the first web page request including the first energy consumption information may be "https://www.a.b.c/test.html? psLvl=9&dfcLvl=1". After receiving the first web page request, the server may determine that the web page content in the foregoing example is the first web page content corresponding to the first web page request, and may determine that "psLvl=9&dfcLvl=1" is the first energy consumption information of the first terminal apparatus.

Because energy consumption needed by the second web page element is not greater than energy consumption indicated by the first energy consumption information, if the first web page content is shown in the foregoing example, and the first energy consumption information is "psLvl=9&dfcLvl=1", the server may determine, based on the first energy consumption information, that power consumed by a first web page element whose power level is lower than psLvl=9 exceeds a requirement of the first terminal apparatus, where the first web page element is not the second web page element, and may determine that web page traffic consumed by a first web page element whose network traffic level is higher than dfcLvl=1 exceeds a requirement of the first terminal apparatus, where the first web page element is not the second web page element. In other words, the server may determine that a first web page element whose power level is not lower than psLvl=9 and whose network traffic level is not higher than dfcLvl=1 is the second web page element.

In this case, the second web page content received by the first terminal apparatus is as follows:

```
"<html>
<head>
<title psLvl=9 dfcLvl=1>My first HTML page</title>
</head>
<body>
<p psLvl=9 dfcLvl=1>Content of a body element is displayed in a
browser. </p>
<p psLvl=9 dfcLvl=1>Content of a title element is displayed in the title
bar of the browser. </p>
</body>
</html>".
```

After receiving the second web page content, the first terminal apparatus may display the second web page content, to meet a requirement of a user for browsing a web page.

In addition, by comparing the second web page content with the first web page content, it may be determined that web page elements included in the second web page content are less than web page elements included in the first web page content, and a quantity of web page elements received and displayed by the first terminal apparatus is reduced. This reduces the energy consumption of the first terminal apparatus.

Further, to clarify the solution provided in this embodiment of this application, a schematic interaction diagram shown in FIG. 7 is further provided. An example shown in FIG. 7 includes the following steps:

Step S41: After obtaining web page content transmitted by a second terminal apparatus, a server determines energy consumption information of a web page element included in the web page content.

Step S42: A first terminal apparatus transmits a first web page request and first energy consumption information of the first terminal apparatus to the server.

In a feasible implementation, the first web page request may be represented in a form of a URL link. In addition, if the first energy consumption information may be loaded into the first web page request, the URL link further includes the first energy consumption information.

Step S43: The server determines first web page content based on the first web page request, selects, based on energy consumption information of a web page element included in the first web page content, a second web page element from a first web page element included in the first web page content, and transmits second web page content including the second web page element to the first terminal apparatus.

Step S44: The first terminal apparatus displays the second web page content.

In the foregoing solution, the server determines the energy consumption information of the first web page element, and determines the second web page element based on energy consumption information of the first web page element determined by the server and the first energy consumption information of the first terminal apparatus.

Correspondingly, this application further provides another embodiment. A web page display method provided in the embodiment is implemented by the first terminal apparatus. Refer to a schematic diagram of a working procedure shown in FIG. 8. A web page display method provided in an embodiment of this application includes the following steps.

Step S51: A first terminal apparatus determines first energy consumption information.

In this embodiment of this application, the first terminal apparatus may display web page content, to meet a requirement of a user for browsing a web page. In this case, to avoid excessive energy consumption in a process of displaying the web page, the first terminal apparatus needs to determine the first energy consumption information.

The first energy consumption information may represent a limitation of the first terminal apparatus on energy consumption of the first terminal apparatus. In the process of displaying the web page, the first terminal apparatus may consume a plurality of types of energy, and correspondingly, the first energy consumption information may include a plurality of types of energy consumption information. In a feasible implementation, the first energy consumption information includes at least one of first network traffic information of the first terminal apparatus and first power information of the first terminal apparatus.

In addition, the first terminal apparatus may determine the first energy consumption information in a plurality of manners. In a feasible implementation, the first energy consumption information includes the first network traffic information of the first terminal apparatus. In this case, that a first terminal apparatus determines first energy consumption information includes: The first terminal apparatus determines the first network traffic information based on available network traffic of the first terminal apparatus. In addition, the first energy consumption information includes the first power information of the first terminal apparatus, and that a first terminal apparatus determines first energy consumption information includes: The first terminal apparatus determines the first power information based on remaining power of the first terminal apparatus.

If the first terminal apparatus subscribes to a network traffic package, the available network traffic of the first terminal apparatus may be determined based on remaining available network traffic of the first terminal apparatus in the network traffic package. Usually, more remaining available network traffic indicates more network traffic indicated by the first network traffic information.

In addition, the first terminal apparatus determines the first power information based on remaining power of the first terminal apparatus. Usually, more remaining power of the first terminal apparatus indicates more power indicated by the first power information.

Alternatively, in another feasible implementation, the first terminal apparatus may determine, based on a received first operation, the first energy consumption information indicated by the first operation. The first operation may be an operation received by the first terminal apparatus by using an input apparatus (for example, a touchscreen) of the first terminal apparatus. According to this solution, the first terminal apparatus may determine the first energy consumption information based on the operation received by the first terminal apparatus.

Certainly, the first terminal apparatus may further determine the first energy consumption information in another manner. This is not limited in embodiments of this application.

Further, the first energy consumption information may be represented in a plurality of forms. One form may be an energy consumption value, for example, the first energy consumption information may include a network traffic value and/or a power value.

Alternatively, in another form, the energy consumption may be classified, and the first energy consumption information includes an energy consumption level. Correspondingly, the first network traffic information may include a network traffic level of the first terminal apparatus, and the first power information may include a power level of the first terminal apparatus.

Step S52: The first terminal apparatus transmits the first energy consumption information and a first web page request to a server.

The first terminal apparatus may generate a corresponding first web page request based on the requirement of the user for browsing the web page.

In this embodiment of this application, the web page content corresponding to the first web page request may be referred to as first web page content. In a feasible example, the first web page request may include a website address of the first web page content, and the website address may be represented in a form of a URL link.

In addition, the first energy consumption information may be loaded into the first web page request. If the first web page request includes the website address of the first web page content, the first energy consumption information may be loaded into the website address. Alternatively, the first energy consumption information and the first web page request may be packed into a data packet by the first terminal apparatus, and the first terminal apparatus transmits the data packet to the server.

After receiving the first web page request and the first energy consumption information that are transmitted by the first terminal apparatus, the server may determine, based on the first web page request, the first web page content corresponding to the first web page request, and then select, based on the first energy consumption information, a second web page element from a first web page element included in the first web page content. Energy consumption needed by the second web page element is not greater than energy consumption indicated by the first energy consumption information. After determining the second web page element, the server transmits second web page content including the second web page element to the first terminal apparatus.

Step S53: The first terminal apparatus obtains and displays the second web page content transmitted by the server. The energy consumption needed by the second web page element included in the second web page content is not greater than the energy consumption indicated by the first energy consumption information.

According to the web page display method provided in this embodiment of this application, the server may selectively transmit, based on the first energy consumption information of the first terminal apparatus, a web page element included in web page content requested by the first terminal apparatus.

In a first solution in the current technology, the server transmits all web page elements included in the first web page content to the first terminal apparatus, and correspondingly, the first terminal apparatus receives and displays all the web page elements. As a result, the first terminal apparatus consumes a large amount of energy.

However, in the solution provided in this embodiment of this application, because the server selectively transmits the web page element to the first terminal apparatus based on the first energy consumption information of the first terminal apparatus, the first terminal apparatus does not receive a web page element whose energy consumption is greater than the energy consumption indicated by the first energy consumption information. Compared with the current technology, this may reduce a quantity of web page elements received by the first terminal apparatus, and correspondingly reduce energy consumed by the first terminal apparatus to display a web page. Further, the solution reduces the energy consumption of the first terminal apparatus, and therefore can further reduce a phenomenon that excessive energy consumption of the first terminal apparatus affects subsequent use of the first terminal apparatus.

In addition, in a second solution in the current technology, the first terminal apparatus receives all the web page elements, determines priorities of the web page elements, and displays a web page element having a higher priority. This process also consumes a large amount of energy of the first terminal apparatus.

However, in embodiments of this application, the server selects, based on the first energy consumption information of the first terminal apparatus and energy consumption of first web page elements, a second web page element to be transmitted to a first terminal. Therefore, the first terminal apparatus does not need to obtain all first web page elements, and does not need to determine a priority of the first web page element, and the second web page element does not need to be selected from the first web page element based on the priority of the first web page element. Therefore, compared with the second solution in the current technology, the solution of this application can also reduce the quantity of the web page elements received by the first terminal apparatus, and correspondingly reduce the energy consumption of the first terminal apparatus. Further, this solution can also reduce the phenomenon that excessive energy consumption of the first terminal apparatus affects the subsequent use of the first terminal apparatus.

Further, in the solution in embodiments of this application, the server selects the second web page element to be transmitted to the first terminal apparatus, and after receiving the second web page content, the first terminal apparatus directly displays the second web page content. Compared with the current technology, the first terminal apparatus does not need to receive all the web page elements, and does not need to select, from all the web page elements, a web page element that needs to be displayed. Therefore, the solution provided in embodiments of this application can further improve efficiency of displaying web page content by the first terminal apparatus, and improve user experience in web page browsing.

In addition, according to the solution in embodiments of this application, the server may not transmit, to the first terminal apparatus, a web page element whose energy consumption is greater than the energy consumption indicated by the first energy consumption information. In this way, an amount of data delivered by the server to the first terminal apparatus can be reduced. Therefore, load of the server can be further reduced, and load of a system including the first terminal apparatus and the server can be reduced.

Correspondingly, this application provides another embodiment. This embodiment provides a web page display method. The method may be applied to a second terminal apparatus. The second terminal apparatus may generate web page content, and may transmit the generated web page content to a server, to implement publishing of the web page content.

Figure 9:
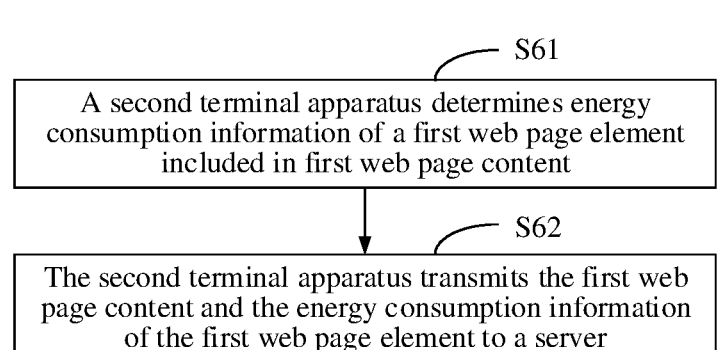
FIG. 9 is a schematic diagram of a working procedure of another web page display method disclosed in an embodiment of this application.

Refer to a schematic diagram of a working procedure shown in FIG. 9. A web page display method provided in an embodiment of this application includes the following steps.

Step S61: A second terminal apparatus determines energy consumption information of a first web page element included in first web page content.

The second terminal apparatus may generate the first web page content, and a web page element in the first web page content may be referred to as the first web page element. In this embodiment of this application, the second terminal apparatus may further determine the energy consumption information of the first web page element.

Step S62: The second terminal apparatus transmits the first web page content and the energy consumption information of the first web page element to a server.

In a feasible implementation, the second terminal apparatus may load the energy consumption information of the first web page element into the first web page content, and then transmit the first web page content loaded with the energy consumption information of the first web page element to the server. For the first web page content loaded with the energy consumption information of the first web page element, refer to the foregoing embodiments, and details are not described herein again.

According to the solution provided in this embodiment of this application, the second terminal apparatus may not only generate the first web page content, but also transmit energy consumption information of the first web page elements included in the first web page content to the server. After receiving the first web page content and the energy consumption information of the first web page element, the server may select, based on the energy consumption information of the first web page element, a second web page element from the first web page element included in the first web page content, and transmit a first terminal apparatus to the first terminal apparatus, to reduce energy consumption of the first terminal apparatus.

The following is an apparatus embodiment of this application, which may be used to perform the method embodiment of this application. For details that are not disclosed in the apparatus embodiment of this application, refer to the method embodiments of this application.

Figure 10:
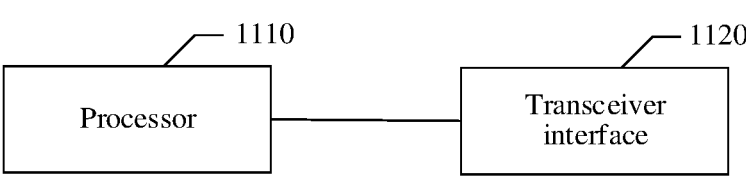
FIG. 10 is a schematic diagram of a structure of a web page display apparatus disclosed in an embodiment of this application.

For implementation of the foregoing embodiments, an embodiment of this application discloses a web page display apparatus. Refer to a schematic diagram of a structure shown in FIG. 10. The web page display apparatus includes a processor 1110 and a transceiver interface 1120.

The web page display apparatus in this embodiment of this application is usually used in a server, and the server may obtain web page content transmitted by a second terminal apparatus. In addition, after receiving a web page request transmitted by a first terminal apparatus, the server may transmit corresponding web page content to the first terminal apparatus.

In the web page display apparatus disclosed in this embodiment of this application, the transceiver interface 1120 is configured to obtain a first web page request transmitted by the first terminal apparatus and first energy consumption information of the first terminal apparatus.

The processor 1110 is configured to select, based on the first energy consumption information, a second web page element from a first web page element included in first web page content. The first web page content is web page content corresponding to the first web page request, and energy consumption needed by the second web page element is not greater than energy consumption indicated by the first energy consumption information.

The transceiver interface 1120 is further configured to transmit second web page content including the second web page element to the first terminal apparatus.

According to the web page display apparatus provided in embodiments of this application, the server not only obtains the first web page request of the first terminal apparatus, but also obtains the first energy consumption information of the first terminal apparatus. In this case, after determining the first web page content corresponding to the first web page request, the server may select, from first web page elements included in the first web page content, the second web page element whose needed energy consumption is not greater than the energy consumption indicated by the first energy consumption information, and transmit the second web page content including the second web page element to the first terminal apparatus, to enable the first terminal apparatus to display the second web page content.

In a first solution in the current technology, the server transmits all web page elements included in the first web page content to the first terminal apparatus, and correspondingly, the first terminal apparatus receives and displays all the web page elements.

However, in the solution provided in embodiments of this application, the server may transmit, to the first terminal apparatus based on the first energy consumption information fed back by the first terminal apparatus, the second web page element whose energy consumption is not greater than the energy consumption indicated by the first energy consumption information, to selectively transmit a web page element to the first terminal apparatus, and the first terminal apparatus displays the second web page content transmitted by the server. Therefore, compared with the current technology, the solution provided in embodiments of this application can reduce a quantity of web page elements received by the first terminal apparatus, and correspondingly reduce energy consumed by the first terminal apparatus to display a web page. Further, the solution reduces energy consumption of the first terminal apparatus, and therefore can further reduce a phenomenon that excessive energy consumption of the first terminal apparatus affects subsequent use of the first terminal apparatus.

In addition, in a second solution in the current technology, the first terminal apparatus receives all the web page elements, determines priorities of the web page elements, and displays a web page element having a higher priority. This process also consumes a large amount of energy of the first terminal apparatus.

However, in embodiments of this application, the server selects, based on the first energy consumption information of the first terminal apparatus and energy consumption of the first web page elements, a second web page element to be transmitted to a first terminal. Therefore, the first terminal apparatus does not need to obtain all the first web page elements, and does not need to determine a priority of the first web page element, and the second web page element does not need to be selected from the first web page element based on the priority of the first web page element. Therefore, compared with the second solution in the current technology, the solution of this application can also reduce the quantity of the web page elements received by the first terminal apparatus, and correspondingly reduce the energy consumption of the first terminal apparatus. Further, this solution can also reduce the phenomenon that excessive energy consumption of the first terminal apparatus affects the subsequent use of the first terminal apparatus.

Further, in the solution in embodiments of this application, the server selects the second web page element to be transmitted to the first terminal apparatus, and after receiving the second web page content, the first terminal apparatus directly displays the second web page content. Compared with the current technology, the first terminal apparatus does not need to receive all the web page elements, and does not need to select, from all the web page elements, a web page element that needs to be displayed. Therefore, the solution provided in embodiments of this application can further improve efficiency of displaying web page content by the first terminal apparatus, and improve user experience in web page browsing.

In addition, according to the solution in embodiments of this application, the server may not transmit, to the first terminal apparatus, a web page element whose energy consumption is greater than the energy consumption indicated by the first energy consumption information. In this way, an amount of data delivered by the server to the first terminal apparatus can be reduced. Therefore, load of the server can be further reduced, and load of a system including the first terminal apparatus and the server can be reduced.

In the solution provided in this embodiment of this application, the server needs to select the second web page element from the first web page element based on the first energy consumption information. This operation may be implemented in a plurality of manners.

In the solution provided in this embodiment of this application, the processor 1110 may select the second web page element from the first web page element in a plurality of manners.

In a feasible implementation, the processor 1110 is specifically configured to select the second web page element from the first web page element based on energy consumption information of the first web page element transmitted by the second terminal apparatus and based on the first energy consumption information.

In another feasible implementation, the processor 1110 is specifically configured to determine energy consumption information of the first web page element, and select the second web page element from the first web page element based on the energy consumption information of the first web page element determined by the processor 1110 and the first energy consumption information.

The first energy consumption information may include a plurality of types of energy consumption information. In a feasible design, the first energy consumption information includes at least one of first network traffic information of the first terminal apparatus and first power information of the first terminal apparatus.

The first energy consumption information of the first terminal apparatus includes the first network traffic information of the first terminal apparatus, and network traffic needed by the first terminal apparatus to display the second web page element is less than network traffic indicated by the first network traffic information.

The first energy consumption information of the first terminal apparatus includes the first power information of the first terminal apparatus, and power needed by the first terminal apparatus to display the second web page element is less than power indicated by the first power information.

Correspondingly, in another embodiment of this application, a web page display apparatus is further provided. The web page display apparatus may be used in a first terminal apparatus, and the first terminal apparatus may be configured to display web page content, to meet a requirement of a user for browsing a web page.

The web page display apparatus disclosed in this embodiment of this application includes a processor and a transceiver interface. The processor is configured to determine first energy consumption information.

The transceiver interface transmits the first energy consumption information and a first web page request to a server, and obtains second web page content transmitted by the server. Energy consumption needed by a second web page element included in the second web page content is not greater than energy consumption indicated by the first energy consumption information.

The processor is further configured to display the second web page content.

In the solution provided in this embodiment of this application, the first energy consumption information may include a plurality of types of energy consumption information. In a feasible design, the first energy consumption information includes at least one of first network traffic information of the first terminal apparatus and first power information of the first terminal apparatus.

The first energy consumption information includes the first network traffic information of the first terminal apparatus, and the processor is specifically configured to determine the first network traffic information based on available network traffic of the first terminal apparatus.

The first energy consumption information includes the first power information of the first terminal apparatus, and the processor is specifically configured to determine the first power information based on remaining power of the first terminal apparatus.

According to the apparatus provided in this embodiment of this application, energy consumption of displaying web page content by the first terminal apparatus may be reduced. Further, efficiency of displaying web page content by the first terminal apparatus can be improved, and user experience in web page browsing can be improved.

Correspondingly, in another embodiment of this application, a web page display apparatus is further provided. The web page display apparatus may be used in a second terminal apparatus, and the second terminal apparatus may be configured to generate web page content, and transmit the web page content to a server, to implement publishing of the web page content.

The web page display apparatus disclosed in this embodiment of this application includes a processor and a transceiver interface. The processor is configured to determine energy consumption information of a first web page element included in first web page content. The transceiver interface is configured to transmit the first web page content and the energy consumption information of the first web page element to the server.

According to the solution provided in this embodiment of this application, the second terminal apparatus may not only generate the first web page content, but also transmit energy consumption information of first web page elements included in the first web page content to the server. After receiving the first web page content and the energy consumption information of the first web page element, the server may select, based on the energy consumption information of the first web page element, a second web page element from the first web page element included in the first web page content, and transmit second web page content including the second web page element to a first terminal apparatus, to reduce energy consumption of the first terminal apparatus.

Figure 11:
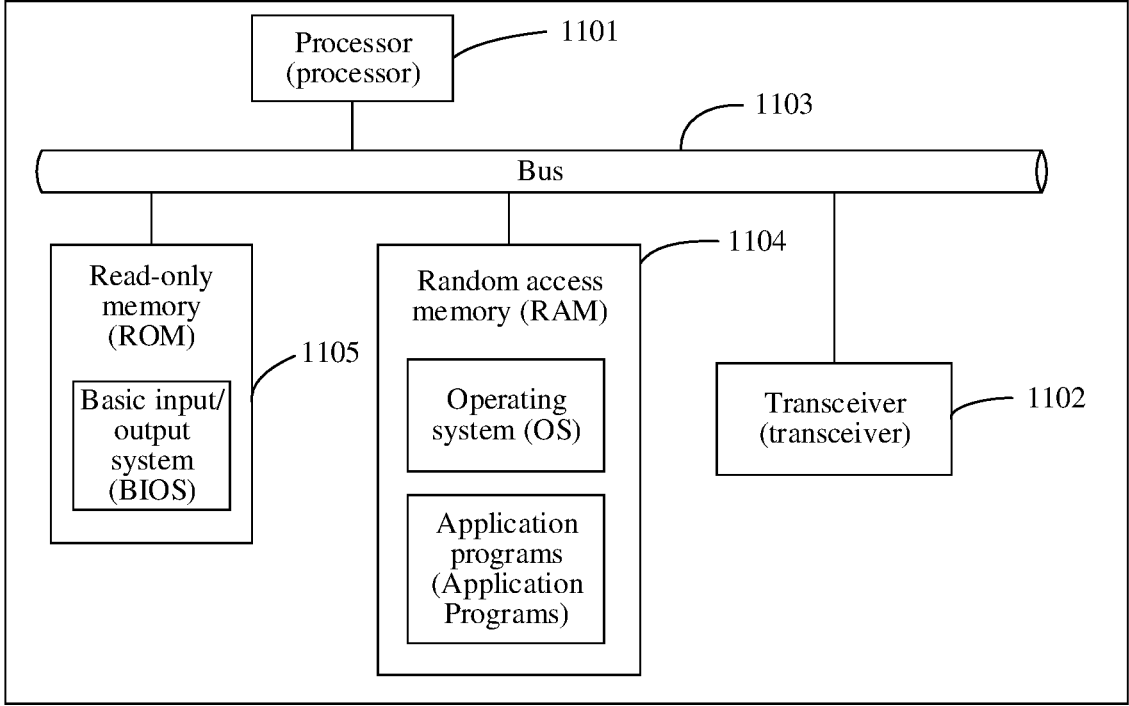
FIG. 11 is a schematic diagram of a structure of a server disclosed in an embodiment of this application.

Correspondingly, corresponding to the foregoing method, an embodiment of this application further discloses a server. Refer to a schematic diagram of a structure shown in FIG. 11. The server includes:

at least one processor 1101 and a memory.

The memory is configured to store program instructions.

The processor is configured to invoke and execute the program instructions stored in the memory, to enable a terminal apparatus to perform all or some of the steps in the embodiment corresponding to FIG. 4.

Further, the terminal apparatus may further include a transceiver 1102 and a bus 1103, and the memory includes a random access memory 1104 and a read-only memory 1105.

The processor is separately coupled to the transceiver, the random access memory, and the read-only memory through the bus. When the terminal apparatus needs to be run, a basic input/output system built into the read-only memory or a bootloader in an embedded system is used to boot a system to start, and boot the terminal apparatus to enter a normal running state. After the terminal apparatus enters the normal running state, an application program and an operating system are run in the random access memory, so that the terminal apparatus performs all or some of the steps in the embodiment corresponding to FIG. 4.

The apparatus in this embodiment of the present invention may correspond to the web page display apparatus in the embodiment corresponding to FIG. 4, and the processor in the apparatus may implement functions of the web page display apparatus in the embodiment corresponding to FIG. 4 or various steps and methods implemented by the web page display apparatus in the embodiment corresponding to FIG. 4. For brevity, details are not described herein again.

Correspondingly, corresponding to the foregoing method, an embodiment of this application further discloses a terminal apparatus. The terminal apparatus includes:

at least one processor and a memory.

The memory is configured to store program instructions.

Figure 8:
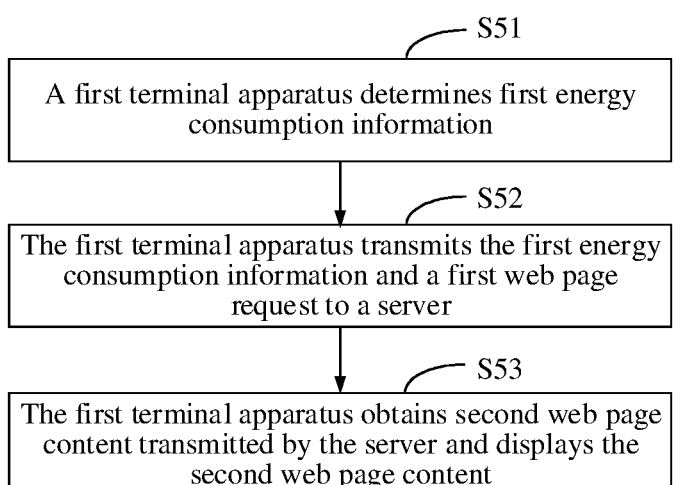
FIG. 8 is a schematic diagram of a working procedure of another web page display method disclosed in an embodiment of this application.

The processor is configured to invoke and execute program instructions stored in the memory, to enable the terminal apparatus to perform all or some of the steps in the embodiment corresponding to FIG. 8.

Further, the terminal apparatus may further include a transceiver and a bus, and the memory includes a random access memory and a read-only memory.

The processor is separately coupled to the transceiver, the random access memory, and the read-only memory through the bus. When the terminal apparatus needs to be run, a basic input/output system built into the read-only memory or a bootloader in an embedded system is used to boot a system to start, and boot the terminal apparatus to enter a normal running state. After the terminal apparatus enters the normal running state, an application program and an operating system are run in the random access memory, so that the terminal apparatus performs all or some of the steps in the embodiment corresponding to FIG. 8.

The apparatus in this embodiment of the present invention may correspond to the web page display apparatus in the embodiment corresponding to FIG. 8, and the processor in the apparatus may implement functions of the web page display apparatus in the embodiment corresponding to FIG. 8 or various steps and methods implemented by the web page display apparatus in the embodiment corresponding to FIG. 8. For brevity, details are not described herein again.

Correspondingly, corresponding to the foregoing method, an embodiment of this application further discloses a terminal apparatus. The terminal apparatus includes:

at least one processor and a memory.

The memory is configured to store program instructions.

The processor is configured to invoke and execute the program instructions stored in the memory, to enable the terminal apparatus to perform all or some of the steps in the embodiment corresponding to FIG. 9.

Further, the terminal apparatus may further include a transceiver and a bus, and the memory includes a random access memory and a read-only memory.

The processor is separately coupled to the transceiver, the random access memory, and the read-only memory through the bus. When the terminal apparatus needs to be run, a basic input/output system built into the read-only memory or a bootloader in an embedded system is used to boot a system to start, and boot the terminal apparatus to enter a normal running state. After the terminal apparatus enters the normal running state, an application program and an operating system are run in the random access memory, so that the terminal apparatus performs all or some of the steps in the embodiment corresponding to FIG. 9.

The apparatus in this embodiment of the present invention may correspond to the web page display apparatus in the embodiment corresponding to FIG. 9, and the processor in the apparatus may implement functions of the web page display apparatus in the embodiment corresponding to FIG. 9 or various steps and methods implemented by the web page display apparatus in the embodiment corresponding to FIG. 9. For brevity, details are not described herein again.

Correspondingly, an embodiment of this application further provides a web page display system. The web page display system includes a server and a terminal apparatus.

In this embodiment of this application, the server may correspond to the web page display apparatus in the embodiment corresponding to FIG. 4, and the processor in the apparatus may implement functions of the web page display apparatus in the embodiment corresponding to FIG. 4 or various steps and methods implemented by the web page display apparatus in the embodiment corresponding to FIG. 4. For brevity, details are not described herein again.

In this embodiment of this application, the terminal apparatus may be used as a first terminal apparatus configured to display web page content. If the web page content needs to be displayed, the terminal apparatus may transmit a first web page request and first energy consumption information to the server, so that the server determines, based on the first energy consumption information, a second web page element in first web page content corresponding to the first web page request, and transmits, to the first terminal apparatus, second web page content including the second web page element.

In other words, in this embodiment of this application, the terminal may correspond to the web page display apparatus in the embodiment corresponding to FIG. 8, and the processor in the apparatus may implement functions of the web page display apparatus in the embodiment corresponding to FIG. 8 or various steps and methods implemented by the web page display apparatus in the embodiment corresponding to FIG. 8. For brevity, details are not described herein again.

Further, the system provided in this embodiment of this application may further include another terminal apparatus, and the terminal apparatus may be used as the second terminal apparatus in the foregoing embodiments. The second terminal apparatus may generate web page content, and transmit the web page content to the server. Further, the second terminal apparatus may further transmit energy consumption information of a first web page element to the server.

In other words, in this embodiment of this application, the terminal may correspond to the web page display apparatus in the embodiment corresponding to FIG. 9, and the processor in the apparatus may implement functions of the web page display apparatus in the embodiment corresponding to FIG. 9 or various steps and methods implemented by the web page display apparatus in the embodiment corresponding to FIG. 9. For brevity, details are not described herein again.

In a feasible implementation, a schematic diagram of a structure of the web page display system may be shown in FIG. 2.

In a specific implementation, an embodiment of this application further provides a computer-readable storage medium. The computer-readable storage medium includes instructions. When a computer-readable medium disposed in any device is run on a computer, the computer-readable medium may implement all or some of the steps in the embodiment corresponding to FIG. 4. A storage medium of the computer-readable medium may be a magnetic disk, an optical disc, a read-only memory (English: read-only memory, ROM for short), a random access memory (English: random access memory, RAM for short), or the like.

In a specific implementation, an embodiment of this application further provides a computer-readable storage medium. The computer-readable storage medium includes instructions. When a computer-readable medium disposed in any device is run on a computer, the computer-readable medium may implement all or some of the steps in the embodiment corresponding to FIG. 8. A storage medium of the computer-readable medium may be a magnetic disk, an optical disc, a read-only memory (English: read-only memory, ROM for short), a random access memory (English: random access memory, RAM for short), or the like.

In a specific implementation, an embodiment of this application further provides a computer-readable storage medium. The computer-readable storage medium includes instructions. When a computer-readable medium disposed in any device is run on a computer, the computer-readable medium may implement all or some of the steps in the embodiment corresponding to FIG. 9. A storage medium of the computer-readable medium may be a magnetic disk, an optical disc, a read-only memory (English: read-only memory, ROM for short), a random access memory (English: random access memory, RAM for short), or the like.

In addition, another embodiment of this application further discloses a computer program product including instructions. When the computer program product is run on an electronic device, the electronic device may implement all or some of the steps in the embodiment corresponding to FIG. 4.

In addition, another embodiment of this application further discloses a computer program product including instructions. When the computer program product is run on an electronic device, the electronic device may implement all or some of the steps in the embodiment corresponding to FIG. 8.

In addition, another embodiment of this application further discloses a computer program product including instructions. When the computer program product is run on an electronic device, the electronic device may implement all or some of the steps in the embodiment corresponding to FIG. 9.

The various illustrative logical units and circuits described in embodiments of this application may implement or operate the described functions by using a general-purpose processor, a digital information processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may alternatively be implemented by a combination of computing apparatuses, such as a digital information processor and a microprocessor, a plurality of microprocessors, one or more microprocessors with a digital information processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may alternatively be integrated into the processor. The processor and the storage medium may be disposed in an ASIC, and the ASIC may be disposed in UE. Optionally, the processor and the storage medium may alternatively be disposed in different components of the UE.

It should be understood that sequence numbers of the processes do not mean execution sequences in various embodiments of this application. The execution sequences of the processes should be determined based on functions and internal logic of the processes, and should not be construed as any limitation on implementation processes of embodiments of this application.

All or a part of the foregoing embodiments may be implemented by using software, hardware, firmware, or any combination thereof. When the software is used to implement the embodiments, all or a part of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

For same or similar parts in embodiments in this specification, refer to these embodiments. Each embodiment focuses on a difference from other embodiments. Especially, apparatus and system embodiments are basically similar to a method embodiment, and therefore are described briefly. For related parts, refer to partial descriptions in the method embodiment.

A person skilled in the art may clearly understand that, the technologies in embodiments of the present invention may be implemented by software in addition to a necessary general hardware platform. Based on such an understanding, the technical solutions of the present invention essentially or the part contributing to the current technology may be implemented in a form of a software product. The software product is stored in a storage medium, such as a ROM/RAM, a magnetic disk, or an optical disc, and includes several instructions for instructing a computer device (which may be a personal computer, a server, or a network device) to perform the methods described in embodiments or some parts of embodiments of the present invention.

For same or similar parts in embodiments of this specification, refer to each other. Especially, the road constraint determining apparatus embodiments disclosed in this application are basically similar to the method embodiment, and therefore are described briefly. For related parts, refer to descriptions in the method embodiment.

The foregoing implementations of the present invention are not intended to limit the protection scope of the present invention.

What is claimed is:

1. A method, comprising:

obtaining, by a server, a first web page request transmitted by a first terminal apparatus and first energy consumption information of the first terminal apparatus, wherein the first web page request comprises an address of a first web page loaded with the first energy consumption information of the first terminal apparatus, the first energy consumption information of the first terminal apparatus comprises a first power level of the first terminal apparatus and a first network traffic level of the first terminal apparatus;

selecting, by the server based on the first energy consumption information, a second web page element from a plurality of first web page elements comprised in first web page content, wherein the first web page content is of the first web page requested using the first web page request, wherein second energy consumption information is comprised in each web page element of the plurality of first web page elements, the second energy consumption information in each web page element comprises a second power level of the respective web page element and a second network traffic level of the respective web page element, and second energy consumption information comprised in the second web page element is not greater than the first energy consumption information; and transmitting, by the server, second web page content comprising the second web page element to the first terminal apparatus; and wherein the second energy consumption information comprised in the second web page element being not greater than the first energy consumption information comprises:

the first network traffic level of the first terminal apparatus is greater than a second network traffic level comprised in the second web page element; and the first power level is less than a second power level comprised in the second web page element.

2. The method according to claim 1, wherein selecting, by the server based on the first energy consumption information, the second web page element from the plurality of first web page elements comprised in the first web page content comprises:

selecting, by the server, the second web page element from the plurality of first web page elements based on the second energy consumption information comprised in each web page element of the plurality of first web page elements and further based on the first energy consumption information, the second energy consumption information comprised in each web page element of the plurality of first web page elements being loaded into the first web page content by a second terminal apparatus.

3. The method according to claim 1, wherein selecting, by the server based on the first energy consumption information, the second web page element from the plurality of first web page elements comprised in the first web page content comprises:

determining, by the server, the second energy consumption information of each web page element of the plurality of first web page elements;

inserting, for each web page element of the plurality of first web page elements, the second energy consumption information of the respective web page element into the respective web page element; and selecting, by the server, the second web page element from the plurality of first web page elements based on the second energy consumption information comprised in each web page element of the plurality of first web page elements determined by the server and the first energy consumption information.

4. The method according to claim 1, wherein power levels of web page elements are categorized according to a plurality of power levels, network traffic levels are categorized according to a plurality of network traffic levels, and a quantity of the plurality of power levels is the same as a quantity of the plurality of network traffic levels.

5. The method according to claim 1, wherein a power level of the first terminal apparatus is categorized according to a plurality of power levels, a network traffic level of the first terminal apparatus is categorized according to a plurality of network traffic levels, and a quantity of the plurality of power levels is the same as a quantity of the plurality of network traffic levels.

6. The method according to claim 1, wherein a higher network traffic of the first terminal apparatus corresponds to a higher level of a plurality of network traffic levels.

7. A method, comprising:

determining, by a first terminal apparatus, first energy consumption information of the first terminal apparatus, wherein the first energy consumption information of the first terminal apparatus comprises a first power level of the first terminal apparatus and a first network traffic level of the first terminal apparatus;

transmitting, by the first terminal apparatus, the first energy consumption information and a first web page request to a server, wherein the first web page request comprises an address of a first web page loaded with the first energy consumption information of the first terminal apparatus; and obtaining and displaying, by the first terminal apparatus, second web page content transmitted by the server, wherein the second web page content comprises a second web page element, wherein second energy consumption information is comprised in the second web page element, wherein the second energy consumption information comprises a second power level of the second web page element and a second network traffic level of the second web page element, the second energy consumption information indicates a second energy consumption needed by the second web page element comprised in the second web page content, and wherein the second energy consumption information comprised in the second web page content is not greater than the first energy consumption information; and wherein the second energy consumption information comprised in the second web page element being not greater than the first energy consumption information comprises:

the first network traffic level of the first terminal apparatus is greater than a second network traffic level comprised in the second web page element; and the first power level of the first terminal apparatus is less than a second power level comprised in the second web page element.

8. The method according to claim 7, wherein:

determining, by the first terminal apparatus, the first energy consumption information comprises:

determining, by the first terminal apparatus, the first network traffic level based on available network traffic of the first terminal apparatus.

9. The method according to claim 7, wherein:

determining, by the first terminal apparatus, the first energy consumption information comprises:

determining, by the first terminal apparatus, the first power level based on remaining power of the first terminal apparatus.

10. The method according to claim 7, wherein a power level of the first terminal apparatus is categorized according to a plurality of power levels, a network traffic level of the first terminal apparatus is categorized according to a plurality of network traffic levels, and a quantity of the plurality of power levels is the same as a quantity of the plurality of network traffic levels.

11. The method according to claim 10, wherein a higher network traffic of the first terminal apparatus corresponds to a higher level of the plurality of network traffic levels.

12. The method according to claim 11, wherein a higher power saving of the first terminal apparatus corresponds to a higher level of the plurality of power levels.

13. An apparatus, comprising:

a processor; and a transceiver interface coupled to the processor, wherein:

the transceiver interface is configured to:

obtain a first web page request transmitted by a first terminal apparatus and first energy consumption information of the first terminal apparatus, wherein the first web page request comprises an address of a first web page loaded with the first energy consumption information of the first terminal apparatus, the first energy consumption information of the first terminal apparatus comprises a first power level of the first terminal apparatus and a first network traffic level of the first terminal apparatus; and transmit second web page content comprising second web page element to the first terminal apparatus, and the processor is configured to:

select, based on the first energy consumption information, the second web page element from a plurality of first web page elements comprised in first web page content, wherein:

the first web page content is web page content of the first web page requested using the first web page request, wherein second energy consumption information is comprised in each web page element of the plurality of first web page elements, and second energy consumption information comprised in the second web page element is not greater than the first energy consumption information; and wherein the second energy consumption information comprised in the second web page element being not greater than the first energy consumption information comprises:

the first network traffic level of the first terminal apparatus is greater than a second network traffic level comprised in the second web page element; and the first power level is less than a second power level comprised in the second web page element.

14. The apparatus according to claim 13, wherein:

the processor is configured to select the second web page element from the plurality of first web page elements based on the second energy consumption information comprised in each web page element of the plurality of first web page elements, and further based on the first energy consumption information, the second energy consumption information comprised in each web page element of the plurality of first web page elements being loaded into the first web page content by a second terminal apparatus.

15. The apparatus according to claim 13, wherein the processor is further configured to:

determine the second energy consumption information of each web page element of the plurality of first web page elements, and select the second web page element from the plurality of first web page elements based on the second energy consumption information of the plurality of first web page elements and the first energy consumption information.

16. The apparatus according to claim 13, wherein power levels of web page elements are categorized according to a plurality of power levels, network traffic levels are categorized according to a plurality of network traffic levels, and a quantity of the plurality of power levels is the same as a quantity of the plurality of network traffic levels.

17. The apparatus according to claim 13, wherein a power level of the first terminal apparatus is categorized according to a plurality of power levels, a network traffic level of the first terminal apparatus is categorized according to a plurality of network traffic levels, and a quantity of the plurality of power levels is the same as a quantity of the plurality of network traffic levels.

18. The apparatus according to claim 17, wherein a higher network traffic of the first terminal apparatus corresponds to a higher level of the plurality of network traffic levels.

* * * * *